(12) United States Patent
Lah

(10) Patent No.: US 10,955,066 B2
(45) Date of Patent: Mar. 23, 2021

(54) FLUID CATALYTIC CRACKING UNIT VALVE

(71) Applicant: DeltaValve, LLC, Sandy, UT (US)

(72) Inventor: Ruben F. Lah, South Jordan, UT (US)

(*) Notice: Subject to any disclaimer, the term of this patent is extended or adjusted under 35 U.S.C. 154(b) by 154 days.

(21) Appl. No.: 15/899,748

(22) Filed: Feb. 20, 2018

(65) Prior Publication Data

US 2018/0238470 A1  Aug. 23, 2018

Related U.S. Application Data

(60) Provisional application No. 62/461,621, filed on Feb. 21, 2017.

(51) Int. Cl.
| | |
|---|---|
| *F16K 43/00* | (2006.01) |
| *C10G 11/18* | (2006.01) |
| *F16K 5/10* | (2006.01) |
| *F16K 5/04* | (2006.01) |

(52) U.S. Cl.
CPC ............ *F16K 43/003* (2013.01); *C10G 11/18* (2013.01); *F16K 5/045* (2013.01); *F16K 5/0407* (2013.01); *F16K 5/10* (2013.01)

(58) Field of Classification Search
CPC .......... F16K 43/003; F16K 5/045; F16K 5/10; F16K 5/0407; C10G 11/18
See application file for complete search history.

(56) References Cited

U.S. PATENT DOCUMENTS

| | | | | |
|---|---|---|---|---|
| 5,181,580 A | * | 1/1993 | Burg ................. | B60V 1/046 137/625.3 |
| 8,661,782 B2 | * | 3/2014 | Kenyon ............... | F02K 7/06 60/247 |

* cited by examiner

*Primary Examiner* — Randy Boyer
*Assistant Examiner* — Juan C Valencia
(74) *Attorney, Agent, or Firm* — Michael F. Krieger; Kirton McConkie

(57) ABSTRACT

Rotary valves are adapted to replace traditional slide valves in fluid catalytic cracking units (FCCUs) such as regenerated catalyst valves, spent catalyst valves, cooled catalyst valves, and recirculation catalyst valves. The rotary valves as discussed herein are significantly more compact than a slide valve having a similar flow capacity. The rotary valve is better adapted to provide flow control or throttling than slide valves are. Flow control or throttling occurs with greater response and precision in response to control inputs and rotation. In addition to the size reduction achieved with the rotary valve, the required controls and/or hydraulic fluid necessary to achieve flow changes are significantly reduced, further saving costs for the valve, as hydraulic power units are not required. The omission of a hydraulic power unit also reduces the size of the valve and/or its accompanying structures within the FCCU.

10 Claims, 24 Drawing Sheets

FLUID CATALYTIC CRACKING UNIT VALVE

CROSS-REFERENCE TO RELATED APPLICATIONS

This application claims priority to United States Provisional Patent Application No. 62/461,621 which was filed on Feb. 21, 2017.

BACKGROUND OF THE INVENTION

1. Field of the Invention

The present invention relates to valves for the petroleum industry, and more particularly to valves for fluid catalytic cracking units.

2. Background and Related Art

Fluid catalytic cracking (FCC) is an important conversion process used in the petroleum industry to convert high-boiling, high-molecular weight hydrocarbon fractions of petroleum crude oils to more valuable products such as gasoline. Catalytic cracking has largely supplanted thermal cracking. The feedstock to a fluid catalytic cracking unit (FCCU) is vaporized and contacted with a fluidized powdered catalyst at high temperature and moderate pressure to break the long-chain molecules of the high-boiling hydrocarbon liquids into shorter molecules.

Modern FCCUs operate continuously, twenty-four hours a day, for up to three to five years between scheduled shutdowns for routine maintenance. In addition to a catalyst riser where the feedstock is contacted with the catalyst, FCCUs include a reactor where the cracked product vapors and the spent catalyst are separated and a catalyst regenerator where the catalyst is regenerated by burning off coke deposited on the catalyst. There are different designs of FCCUs in use, with two general types being a "stacked" type where the reactor and the catalyst regenerator are contained in a single vessel, and a "side-by-side" type where the reactor and the catalyst regenerator are in two separate vessels.

FIG. 1 provides a diagram view of a side-by-side configuration of a representative FCCU. The reactor and regenerator are considered to be the heart of the fluid catalytic cracking unit. The preheated high-boiling petroleum feedstock (at about 315 to 430° C.) consisting of long-chain hydrocarbon molecules is combined with recycle slurry oil from the bottom of a distillation column 10 and injected into a catalyst riser 12 where it is vaporized and cracked into smaller molecules of vapor by contact and mixing with the very hot powdered catalyst from a regenerator 14. All of the cracking reactions take place in the catalyst riser 12 within a period of two to four seconds. The hydrocarbon vapors "fluidize" the powdered catalyst and the mixture of hydrocarbon vapors and catalyst flows upward to enter a reactor 16 at a temperature of about 535° C. and a pressure of about 1.72 bar.

In the reactor 16, the cracked product vapors are: (a) separated from the spent catalyst by flowing through a set of two-stage cyclones within the reactor 16 and (b) the spent catalyst flows downward through a steam stripping section to remove any hydrocarbon vapors before the spent catalyst returns to the catalyst regenerator 14. The flow of spent catalyst to the regenerator 14 is regulated by a valve 18 in the spent catalyst line. The valve 18 has traditionally been a slide valve.

Since the cracking reactions produce some carbonaceous material (referred to as catalyst coke) that deposits on the catalyst and very quickly reduces the catalyst reactivity, the catalyst is regenerated by burning off the deposited coke with air blown into the regenerator 14. The regenerator 14 operates at a temperature of about 715° C. and a pressure of about 2.41 bar, hence the regenerator 14 operates at about 0.7 bar higher pressure than the reactor 16. The combustion of the coke is exothermic and it produces a large amount of heat that is partially absorbed by the regenerated catalyst and provides the heat required for the vaporization of the feedstock and the endothermic cracking reactions that take place in the catalyst riser 12. For that reason, FCCUs are often referred to as being "heat balanced."

The hot catalyst (at about 715° C.) leaving the regenerator 14 flows into a catalyst withdrawal well where any entrained combustion flue gases are allowed to escape and flow back into the upper part to the regenerator 14. The flow of regenerated catalyst to the feedstock injection point below the catalyst riser 12 is regulated by a valve 20 in the regenerated catalyst line. This valve 20 has also traditionally been a slide valve. The hot flue gas exits the regenerator 14 after passing through multiple sets of two-stage cyclones that remove entrained catalyst from the flue gas.

The valves 18, 20 in the FCCU are control valves that may be identified by their location and function in the FCCU. Such valves may include regenerated catalyst slide valves, spent catalyst slide valves, cooled catalyst slide valves, and recirculation catalyst slide valves. The regeneration slide valve (e.g., valve 20) regulates the flow of regenerated catalyst to the riser 12, maintains the pressure head in the standpipe, and protects the regenerator 14 from flow reversal. The spent slide valve (e.g., valve 18) controls the stripper catalyst level, regulates flow of spent catalyst to the regenerator 14, and protects the reactor 16 and the main fractionator from a flow reversal.

Because of the variation in FCCU designs, it is typical for each valve to be custom designed for the FCCU in which it is used. Such valves are also typically welded into the FCCU lines. The valves of the FCCU are subject to the extreme temperatures and pressures present in the FCCU, and are designed to withstand the environment in which they are used. Nevertheless, it is typical for such valves to eventually wear out and to require service or replacement. While some valves permit valve components to be accessed and replaced without requiring removal of the entire valve body from the FCCU, it can still be difficult to complete a replacement or refurbishment of the valve components during maintenance shutdown periods of the FCCU.

Some of the difficulties are inherent with the variability of valve designs used in various FCCUs. The variability of valve design means that the valve components to be replaced or repaired must be custom made for the valves in question. Because it may be impossible to fully know what components of a valve will require work to be done, additional difficulties may be encountered after the FCCU has been shut down for servicing. Delays that may result from difficulties encountered during the servicing process may cause the FCCU to remain out of service longer than expected, at great cost to the refinery.

In addition to the service and maintenance problems inherent to the slide valves currently used in FCCUs, such slide valves are inherently ill-suited for the tasks which are required of them. In particular, FCCU valves are commonly required to perform a throttling function to maintain proper pre-valve and post-valve pressures and/or pressure differentials within the FCCU. Slide valves, however, are poorly suited for providing throttling in a way that provides the desired functions to the FCCU. Indeed, when throttling is desired, the valve must typically be actuated a significant distance before any throttling occurs, and it can be difficult to achieve a desired throttling level or to maintain control over the throttling level achieved. As a result, the use of slide valves is inefficient for establishing flow control within the FCCU.

In addition, due to the manner in which slide valves used in the FCCU control throttling, the slide valves create eddies in the flow within the FCCU. The resultant eddies cause increased wear of the valves as well as of surrounding components of the FCCU. FIG. 2 illustrates cutaway views of various states of a representative cold shell design slide valve that might be adapted for use in a FCCU. The slide valve includes a blind 30 that is adapted to be slidingly actuated in either direction across the aperture of the valve to any of a variety of points, six of which are illustrated in FIG. 2 (it should be noted that in the FCCU, slide valves are typically never operated in the fully closed position; the valves are control valves only). The blind 30 is typically covered with a refractory lining, such as in a hexmesh type anchor system, and a refractory lining is also provided to the upstream side of the blind 30. The refractory lining provides additional wear capability to the valve.

Sliding valves such as those shown in FIG. 2 require surrounding structure sufficient to allow the blind 30 to be actuated along its full throw distance, plus sufficient additional structure to support the blind 30 and its accompanying structure at any point along its throw distance. Accordingly, the actuating structure for the slide valve typically extends outward from the valve multiple times the width of the valve and of the line before and after the valve. For example, FIG. 3 illustrates an external view of a representative slide valve 32, along with its accompanying control structure 34. In this instance, the slide valve 32 is controlled hydraulically, so the control structure 34 includes a hydraulic power unit. Slide valves may also be controlled electrically. As may be seen from FIG. 3, the FCCU unit must be designed to accommodate the large structure protruding from the side of each slide valve 32, as well as to provide a location for the large control structure 34 of the slide valve 32. With the typical FCCU including four such valves, the size constraints and complexity involved in incorporating such valves, as well as in designing the FCCU to accommodate for access and repair of the valves during servicing are significant.

In fact, the design and servicing of slide valves is a significant factor in the FCCU shutdown and routine maintenance process. As discussed above, each FCCU is essentially unique, and the slide valves for each FCCU are typically custom built and installed in that FCCU. When valve replacement and/or refurbishment is contemplated, it is common to have the new components custom manufactured for the replacement/refurbishment. The custom design and building of such components further increases the cost and complexity of the replacement and maintenance processes. The slide valves are typically welded in place, and full replacement of the slide valves involves cutting them out of the applicable line and welding in a whole new valve.

For these and other reasons, the slide valves currently used in FCCUs have multiple deficiencies that have yet to be addressed by the industry.

BRIEF SUMMARY OF THE INVENTION

Implementation of the invention provides a rotary valve for use in fluid catalytic cracking units (FCCU). Such valves are adapted to replace traditional slide valves such as regenerated catalyst valves, spent catalyst valves, cooled catalyst valves, and recirculation catalyst valves. The rotary valve as discussed herein is significantly more compact than a slide valve having a similar flow capacity. The rotary valve is better adapted to provide flow control or throttling than slide valves are. Flow control or throttling occurs with greater response and precision in response to control inputs and rotation. In addition to the size reduction achieved with the rotary valve, the required controls and/or hydraulic fluid necessary to achieve flow changes are significantly reduced, further saving costs for the valve, as hydraulic power units are not required. The omission of a hydraulic power unit also reduces the size of the valve and/or its accompanying structures within the FCCU.

The configuration of the rotary valve also better protects the internal elements of the rotary valve when compared to traditional slide valves. The rotary valve may be manufactured according to certain standard sizes, and the rotary valve may be adapted to have certain components replaced therein to modify the size/flow rate of the rotary valve, thereby standardizing components across multiple FCCUs. The standardization of components permits the rotary valve to be more rapidly serviced and/or replaced, reducing downtime of scheduled maintenance stops. Additionally, the rotary valve may be provided as a bolt-in structure with end flanges, such that the entire valve may be rapidly replaced as necessary.

The rotary valve is longer lasting than the typical slide valves and has fewer problems as well. The rotary valve may be electro-hydraulically actuated, or may be electrically actuated. The packing glands associated with the rotary drive mechanisms are subject to less wear than are the corresponding glands associated with the sliding drive mechanisms of the traditional sliding valves. The rotary valve is adapted to continue providing adequate flow control even as the valve internal components are subject to wear by simply modifying the amount of rotation of the control components. Because of the design of the rotary valve, it is not necessary to have individuals inside the pipeline during the refurbishment/replacement process as with traditional slide valves (e.g., during replacement of relevant refractory linings). Additional advantages of the rotary valve will be apparent from the additional discussion herein.

According to implementations of the invention, a rotary valve for use in a FCCU includes a valve body having an inlet and an outlet and a flow path extending between the inlet and the outlet, the flow path providing a path for a fluid catalytic cracking material to selectively flow between the inlet and the outlet. The rotary valve also includes a first drum rotatably disposed within the valve body in the flow path, the first drum having a first drum flow aperture passing therethrough and a first shaft connected to the first drum and extending from an interior of the valve body to an exterior of the valve body through a first shaft aperture. A rotational torque applied to the first shaft at the exterior of the valve body may cause the first drum to rotate within the valve body to control flow of material through the flow path and the first drum flow aperture.

The rotary valve may also include a first rotator coupled to the first shaft at the exterior of the valve body and adapted to apply a rotational torque to the first shaft. The first rotator may be a hydraulic rotator, an electric rotator, or an electro-hydraulic rotator. The first drum flow aperture may include a refractory material surface.

The rotary valve may also include a second drum rotatably disposed within the valve body in the flow path, the second drum having a bore adapted to rotatably receive the first drum therein, an upstream flow aperture, and a downstream flow aperture. The upstream flow aperture and the downstream flow aperture may be located on the second drum such that the first drum and the second drum can be rotated so the upstream flow aperture, the first drum flow aperture, and the downstream flow aperture are substantially aligned and share a common axis. The second drum may be connected to a second shaft that extends from the interior of the valve body to the exterior of the valve body through a second shaft aperture disposed on an opposite side of the valve body from the first shaft aperture. A rotational torque applied to the second shaft at the exterior of the valve body may cause the second drum to rotate within the valve body to control flow of material through the flow path, the upstream flow aperture, the first drum flow aperture, and the downstream flow aperture. A second rotator may be coupled to the second shaft at the exterior of the valve body and be adapted to apply a rotational torque to the second shaft. The second rotator may be a hydraulic rotator, an electric rotator, or an electro-hydraulic rotator.

The first drum and the second drum may be adapted to be counter-rotated to control flow of material through the flow path. The rotary valve may achieve a substantially closed state when the first drum and the second drum are each counter-rotated forty-five degrees or less from a position where the upstream flow aperture, the first drum flow aperture, and the downstream flow aperture are aligned.

The rotary valve may also include a refractory cone adapted to be set in an inlet area extending in the interior of the valve body between the inlet and the first and second drums, or between the inlet area and the first drum, and to be primarily secured in the inlet area by gravity.

The rotary valve may also include an inlet flange at the inlet and an outlet flange at the outlet such that the rotary valve can be removably attached to an existing FCCU pipeline having corresponding flanges using fasteners and without welding the rotary valve to the FCCU pipeline.

According to further implementations of the invention, a rotary valve for use in a FCCU includes a valve body having an inlet and an outlet and a flow path extending between the inlet and the outlet, the flow path providing a path for a fluid catalytic cracking material to selectively flow between the inlet and the outlet. The rotary valve also includes a first drum rotatably disposed within the valve body in the flow path, the first drum having a bore adapted to rotatably receive a second drum therein, an upstream flow aperture, and a downstream flow aperture. The rotary valve also includes the second drum rotatably disposed within the bore of the first drum, and having a second drum flow aperture passing therethrough. The upstream flow aperture and the downstream flow aperture may be located on the first drum and the second drum flow aperture may be located on the second drum such that the first drum and the second drum can be rotated so the upstream flow aperture, the second drum flow aperture, and the downstream flow aperture are substantially aligned and share a common axis.

The rotary valve may further include a first shaft connected to the first drum and extending from an interior of the valve body to an exterior of the valve body through a first shaft aperture and a second shaft connected to the second drum and extending from the interior of the valve body to the exterior of the valve body through a second shaft aperture located on an opposite side of the valve body from the first shaft aperture. A rotational torque applied to the first shaft at the exterior of the valve body may cause the first drum to rotate within the valve body, and a rotational torque applied to the second shaft at the exterior of the valve body may cause the second drum to rotate within the first drum, whereby rotation of the first drum and rotation of the second drum control flow of material through the flow path.

The rotary valve may further include a refractory cone adapted to be set in an inlet area extending in the interior of the valve body between the inlet and the first drum and to be primarily secured in the inlet area by gravity. The first drum and the second drum may be adapted to be counter-rotated to control flow of material through the flow path. The rotary valve may achieve a substantially closed state when the first drum and the second drum are each counter-rotated forty-five degrees or less from a position where the upstream flow aperture, the second drum flow aperture, and the downstream flow aperture are aligned. The rotary valve may also include an inlet flange at the inlet and an outlet flange at the outlet such that the rotary valve can be removably attached to an existing FCCU pipeline having corresponding flanges using fasteners and without welding the rotary valve to the FCCU pipeline.

According to additional implementations of the invention, a rotary valve for use in a FCCU includes a valve body having an inlet and an outlet and a flow path extending between the inlet and the outlet, the flow path providing a path for a fluid catalytic cracking material to selectively flow between the inlet and the outlet. The rotary valve also includes an outer cylindrical drum rotatably disposed within the valve body in the flow path, the outer cylindrical drum having a bore adapted to rotatably receive an inner cylindrical drum therein, an upstream flow aperture, and a downstream flow aperture. The rotary valve also includes the inner cylindrical drum that is rotatably disposed within the bore of the outer cylindrical drum. The inner cylindrical drum includes an inner drum flow aperture passing therethrough. The upstream flow aperture and the downstream flow aperture may be located on the outer cylindrical drum and the inner drum flow aperture may be located on the inner cylindrical drum such that the outer cylindrical drum and the inner cylindrical drum can be rotated so the upstream flow aperture, the inner drum flow aperture, and the downstream flow aperture are substantially aligned and share a common axis. The outer cylindrical drum and the inner cylindrical drum may be adapted to be counter-rotated to control flow of material through the flow path.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
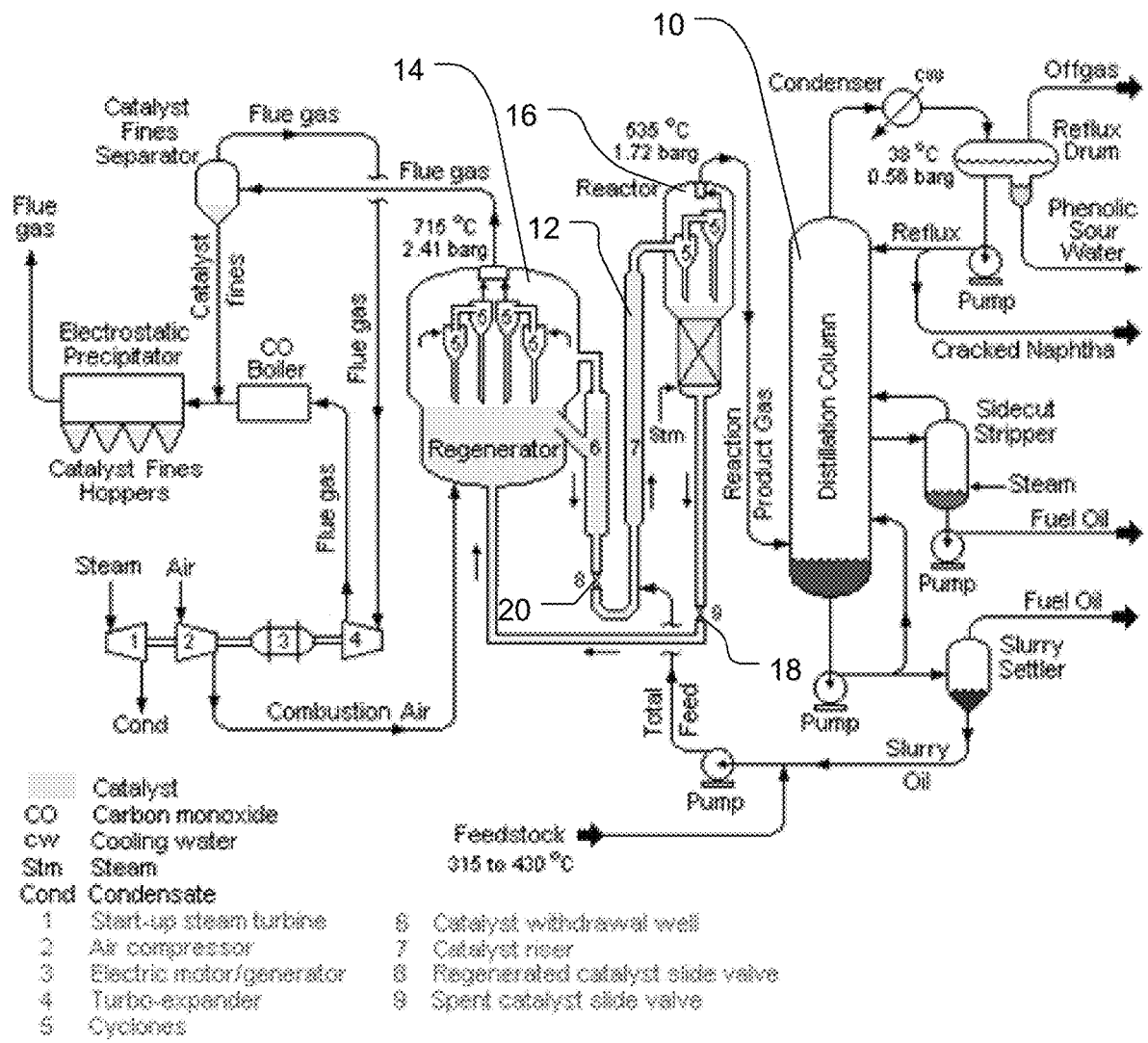
FIG. 1 shows a diagrammatical view of a representative fluid catalytic cracking unit (FCCU)
Figure 2:
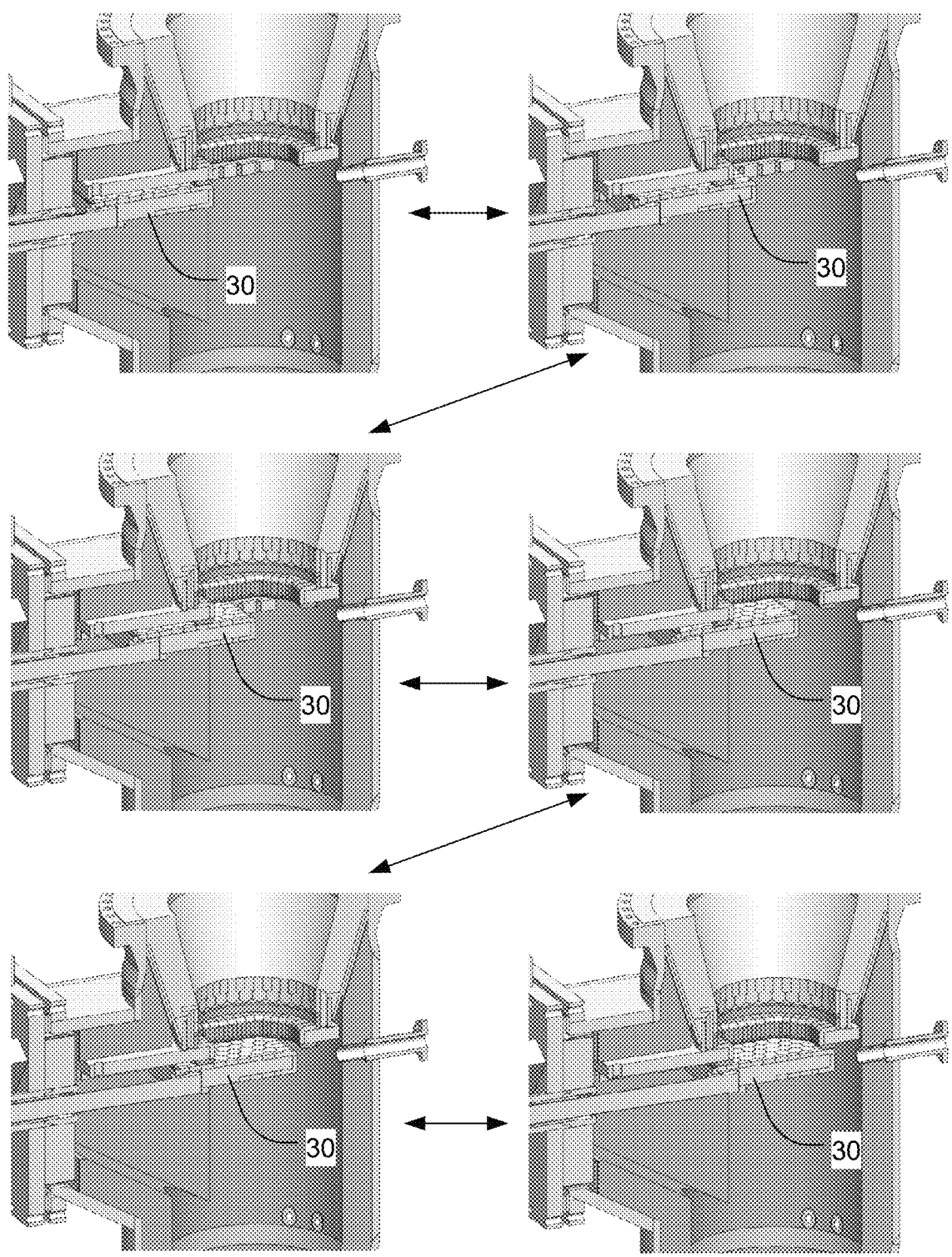
FIG. 2 shows views of actuation of a representative slide valve for use in FCCUs.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

According to embodiments of the invention, a rotary valve for use in a FCCU includes a valve body having an inlet and an outlet and a flow path extending between the inlet and the outlet, the flow path providing a path for a fluid catalytic cracking material to selectively flow between the inlet and the outlet. The rotary valve also includes a first drum rotatably disposed within the valve body in the flow path, the first drum having a first drum flow aperture passing therethrough and a first shaft connected to the first drum and extending from an interior of the valve body to an exterior of the valve body through a first shaft aperture. A rotational torque applied to the first shaft at the exterior of the valve body may cause the first drum to rotate within the valve body to control flow of material through the flow path and the first drum flow aperture.

The rotary valve may also include a first rotator coupled to the first shaft at the exterior of the valve body and adapted to apply a rotational torque to the first shaft. The first rotator may be a hydraulic rotator, an electric rotator, or an electro-hydraulic rotator. The first drum flow aperture may include a refractory material surface.

The rotary valve may also include a second drum rotatably disposed within the valve body in the flow path, the second drum having a bore adapted to rotatably receive the first drum therein, an upstream flow aperture, and a downstream flow aperture. The upstream flow aperture and the downstream flow aperture may be located on the second drum such that the first drum and the second drum can be rotated so the upstream flow aperture, the first drum flow aperture, and the downstream flow aperture are substantially aligned and share a common axis. The second drum may be connected to a second shaft that extends from the interior of the valve body to the exterior of the valve body through a second shaft aperture disposed on an opposite side of the valve body from the first shaft aperture. A rotational torque applied to the second shaft at the exterior of the valve body may cause the second drum to rotate within the valve body to control flow of material through the flow path, the upstream flow aperture, the first drum flow aperture, and the downstream flow aperture. A second rotator may be coupled to the second shaft at the exterior of the valve body and be adapted to apply a rotational torque to the second shaft. The second rotator may be a hydraulic rotator, an electric rotator, or an electro-hydraulic rotator.

The first drum and the second drum may be adapted to be counter-rotated to control flow of material through the flow path. The rotary valve may achieve a substantially closed state when the first drum and the second drum are each counter-rotated forty-five degrees or less from a position where the upstream flow aperture, the first drum flow aperture, and the downstream flow aperture are aligned.

The rotary valve may also include a refractory cone adapted to be set in an inlet area extending in the interior of the valve body between the inlet and the first and second drums, or between the inlet area and the first drum, and to be primarily secured in the inlet area by gravity.

The rotary valve may also include an inlet flange at the inlet and an outlet flange at the outlet such that the rotary valve can be removably attached to an existing FCCU pipeline having corresponding flanges using fasteners and without welding the rotary valve to the FCCU pipeline.

According to further embodiments of the invention, a rotary valve for use in a FCCU includes a valve body having an inlet and an outlet and a flow path extending between the inlet and the outlet, the flow path providing a path for a fluid catalytic cracking material to selectively flow between the inlet and the outlet. The rotary valve also includes a first drum rotatably disposed within the valve body in the flow path, the first drum having a bore adapted to rotatably receive a second drum therein, an upstream flow aperture, and a downstream flow aperture. The rotary valve also includes the second drum rotatably disposed within the bore of the first drum, and having a second drum flow aperture passing therethrough. The upstream flow aperture and the downstream flow aperture may be located on the first drum and the second drum flow aperture may be located on the second drum such that the first drum and the second drum can be rotated so the upstream flow aperture, the second drum flow aperture, and the downstream flow aperture are substantially aligned and share a common axis.

The rotary valve may further include a first shaft connected to the first drum and extending from an interior of the valve body to an exterior of the valve body through a first shaft aperture and a second shaft connected to the second drum and extending from the interior of the valve body to the exterior of the valve body through a second shaft aperture located on an opposite side of the valve body from the first shaft aperture. A rotational torque applied to the first shaft at the exterior of the valve body may cause the first drum to rotate within the valve body, and a rotational torque applied to the second shaft at the exterior of the valve body may cause the second drum to rotate within the first drum, whereby rotation of the first drum and rotation of the second drum control flow of material through the flow path.

The rotary valve may further include a refractory cone adapted to be set in an inlet area extending in the interior of the valve body between the inlet and the first drum and to be primarily secured in the inlet area by gravity. The first drum and the second drum may be adapted to be counter-rotated to control flow of material through the flow path. The rotary valve may achieve a substantially closed state when the first drum and the second drum are each counter-rotated forty-five degrees or less from a position where the upstream flow aperture, the second drum flow aperture, and the downstream flow aperture are aligned. The rotary valve may also include an inlet flange at the inlet and an outlet flange at the outlet such that the rotary valve can be removably attached to an existing FCCU pipeline having corresponding flanges using fasteners and without welding the rotary valve to the FCCU pipeline.

According to additional embodiments of the invention, a rotary valve for use in a FCCU includes a valve body having an inlet and an outlet and a flow path extending between the inlet and the outlet, the flow path providing a path for a fluid catalytic cracking material to selectively flow between the inlet and the outlet. The rotary valve also includes an outer cylindrical drum rotatably disposed within the valve body in the flow path, the outer cylindrical drum having a bore adapted to rotatably receive an inner cylindrical drum therein, an upstream flow aperture, and a downstream flow aperture. The rotary valve also includes the inner cylindrical drum that is rotatably disposed within the bore of the outer cylindrical drum. The inner cylindrical drum includes an inner drum flow aperture passing therethrough. The upstream flow aperture and the downstream flow aperture may be located on the outer cylindrical drum and the inner drum flow aperture may be located on the inner cylindrical drum such that the outer cylindrical drum and the inner cylindrical drum can be rotated so the upstream flow aperture, the inner drum flow aperture, and the downstream flow aperture are substantially aligned and share a common axis. The outer cylindrical drum and the inner cylindrical drum may be adapted to be counter-rotated to control flow of material through the flow path.

Figure 4:
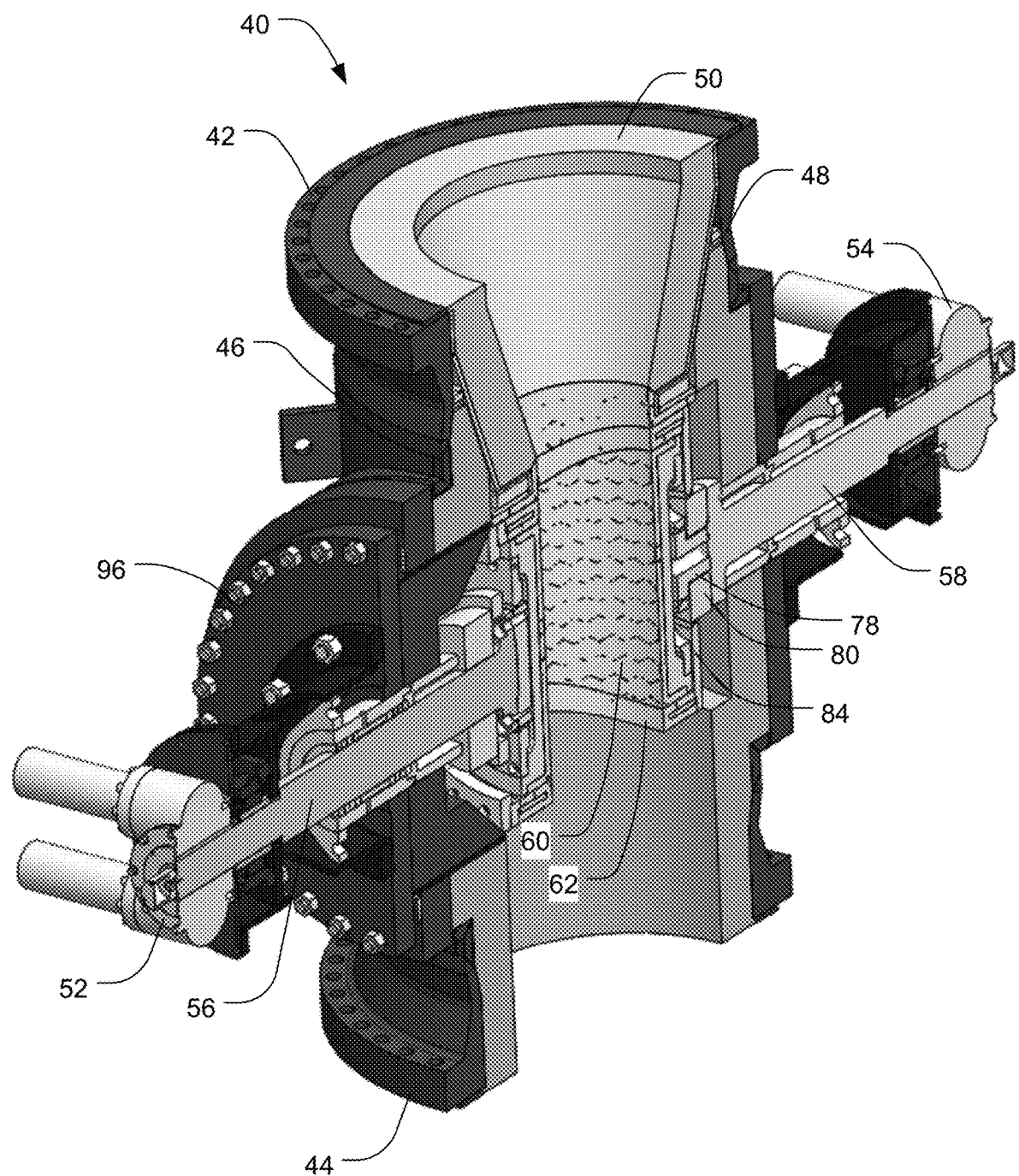
FIG. 4 shows a perspective view of a sectioned illustrative rotary valve.

FIG. 4 shows a perspective view of a representative rotary valve 40 sectioned along a plane passing through the rotational axis of its rotational parts. In FIG. 4, the cross section is taken along the rotational axis of the rotational elements of the rotary valve 40 as will be discussed in more detail below. As shown in FIG. 4, the valve may be provided with a top flange 42 and a bottom flange 44, such that the valve may be removably coupled to an existing FCCU pipeline, such as by bolting to corresponding flanges (not shown) welded to the existing FCCU pipeline. Thus, the rotary valve 40 may be adapted to replace an existing slide valve by cutting out the old slide valve and welding top and bottom flanges to the existing FCCU pipeline at locations adapted to receive the new rotary valve 40. As necessary, the corresponding flanges welded into the existing FCCU pipeline may be tapered to provide for a size change between the existing FCCU pipeline and the rotary valve 40, which may further permit the rotary valve 40 to be of a standard size while being used in an existing pipeline of a non-standard size.

The rotary valve 40 includes a body 46 extending between the top flange 42 and the bottom flange 44. The top flange 42 therefore defines an inlet to the valve body 46 and the bottom flange 44 defines an outlet to the valve body 46. The body 46 may be formed of conventional materials using conventional processes. Additionally, inner portions of the body 46 may be lined with materials adapted to withstand the environment (heat, pressure, and petroleum products) to which the inner portions of the rotary valve 40 may be subject, as is known in the art. The body 46 may include an upper inlet area 48 extending roughly between the upper flange 42 and a portion of the rotary valve 40 containing certain rotating elements of the rotary valve 40. This upper inlet area may define an inner surface having a generally conical shape adapted to receive a complementary-shaped refractory cone 50.

The refractory cone 50 provides protection to the valve body 46, as is known in the art. In contrast to refractory linings used in typical valves, the refractory cone 50 can be secured within the body 46 and particularly in the upper inlet area 48 using gravity alone: the refractory cone 50 is simply set into the upper inlet area 48 without requiring any welding between the body 46 and the refractory cone 50. When the rotary valve is to be serviced, and if the existing refractory cone 50 is worn and needs to be replaced, the rotary valve 40 can be unbolted from the FCCU pipeline, moved to the side to permit access to the existing refractory cone 50, which can then be withdrawn from the rotary valve 40 without requiring any cutting work, as no welding of the refractory cone 50 occurred, and the new refractory cone 50 can be set in place and the rotary valve 40 returned to its place in the FCCU pipeline. As may be appreciated, one result of this refractory cone 50 replacement procedure is that refinery personnel are not required to enter the rotary valve 40 or the FCCU pipeline to attach, remove, or service the refractory cone 50.

As seen in FIG. 4, the body 46 may have a generally cruciform cylindrical shape. Put differently, the body 46 may have a primary general shape of a first, generally vertical, cylinder shape extending between the top flange 42 and the bottom flange 44 intersecting with a second, generally horizontal, cylinder shape. The first and second general cylinder shapes may essentially bisect each other, or one or both general cylinder shapes may be offset from the central point of the other. In other words, the first general cylinder shape may extend approximately equally above and below the second general cylinder shape or may extend different amounts above and below the second general cylinder shape, and the second general cylinder shape may extend approximately equally to either side of the first general cylinder shape or may extend different amounts on different sides of the first general cylinder shape. The first general cylinder shape defines a general flow path for material through the rotary valve 40, while the second general cylinder shape generally contains the rotating flow-control portions of the rotary valve 40 that contact the material flowing through the rotary valve 40.

Figure 3:
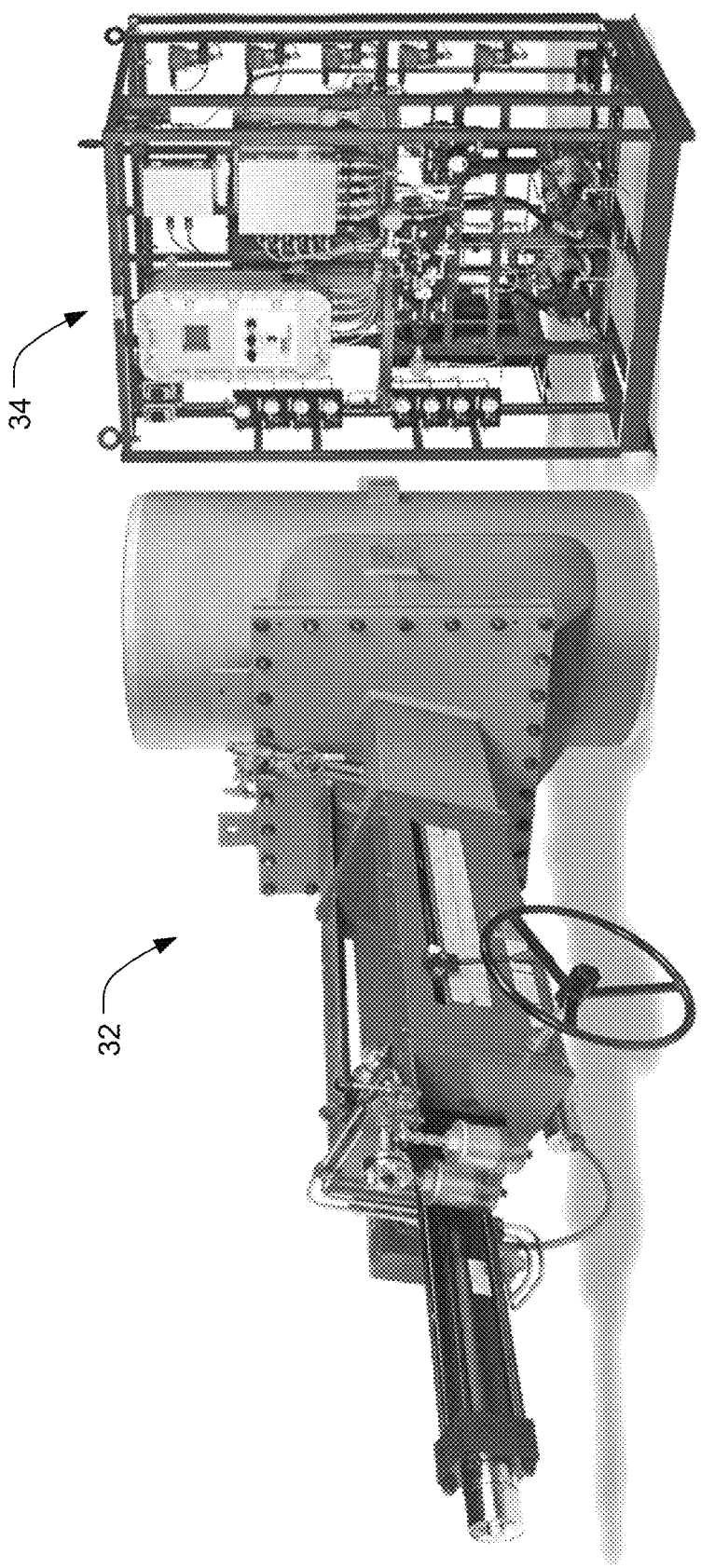
FIG. 3 shows a perspective view of a representative slide valve and its accompanying control unit.

As may be seen in FIG. 4, portions of the rotary valve 40 extend from either side of the second, generally horizontal, general cylinder shape portion of the body 46, providing the functional control machinery that drives the rotating forces to the rotating flow-control portions of the rotary valve 40 within the body 46. FIG. 4, however, shows the entire structure that is required to perform flow control using the rotary valve 40—there is no other external structure necessary, as there is no need for a separate control structure and no need for a separate hydraulic power unit. As may be appreciated by comparing FIG. 4 with FIG. 3, the overall size of the rotary valve 40 and its accompanying structures is much more compact than the overall size of the slide valve 32 with its accompanying controlling structure 34. Additionally, there is no need for hydraulic lines running between an external control structure and the rotary valve 40, as the rotary valve can be actuated with much less hydraulic fluid which can be supplied via a small tank directly mounted on the rotary valve 40.

The rotary valve 40 in the illustrative embodiment is electro-hydraulically actuated, though alternative valves may be electrically actuated. Accordingly, the rotary valve 40 includes a first electro-hydraulic rotator 52 and a second electro-hydraulic rotator 54. Each of the electro-hydraulic rotators 52, 54 may include a rack-and-pinion drive mechanism that converts hydraulically driven linear motion into high-torque rotary motion with very little hydraulic fluid. The first electro-hydraulic rotator 52 drives rotation of a first shaft 56, and the second electro-hydraulic rotator 54 drives rotation of a second shaft 58. The first shaft 56 is operatively connected to an inner cylindrical drum 60, and the second shaft 56 is operatively connected to an outer cylindrical drum 62.

Figure 5:
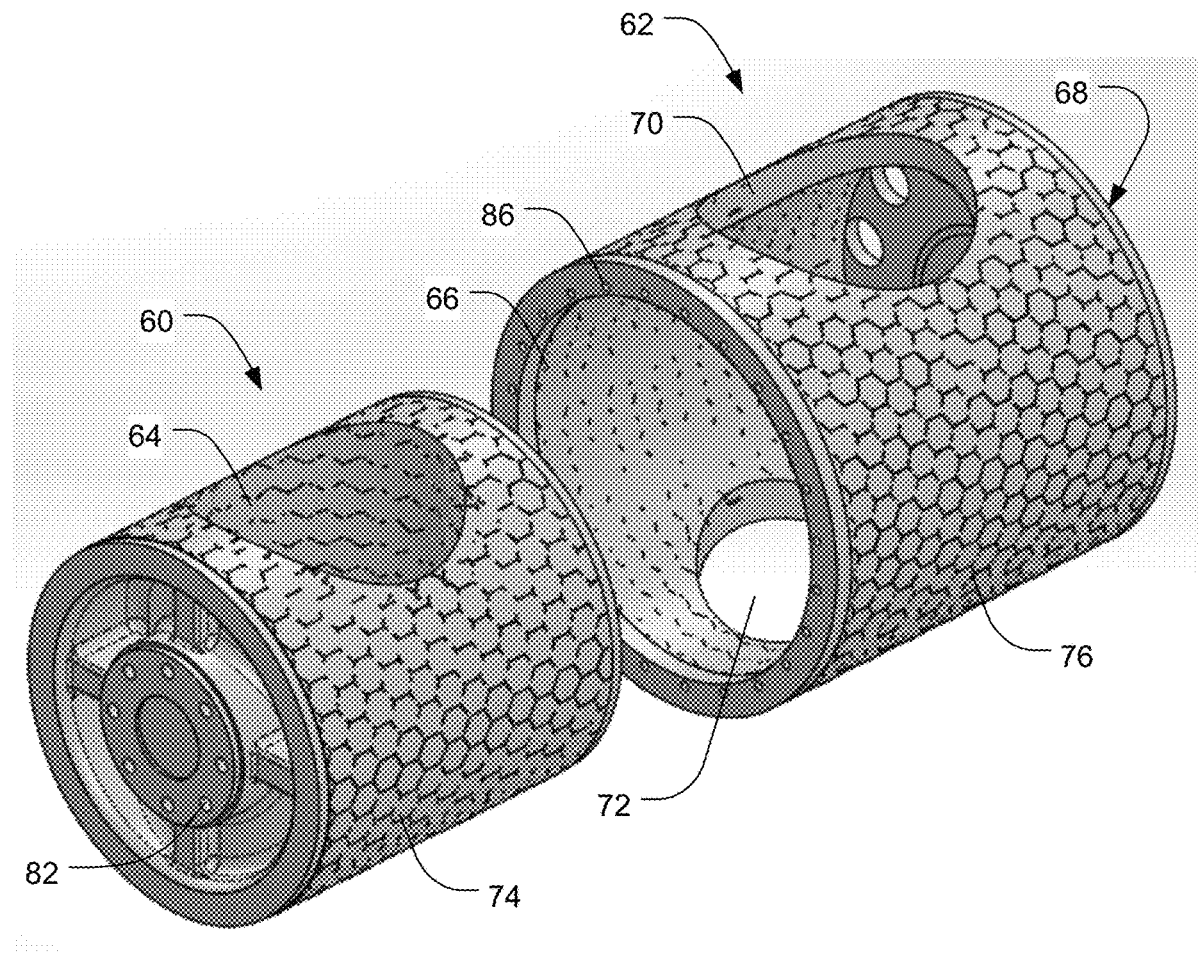
FIG. 5 shows an exploded perspective view of rotational components of the rotary valve of FIG. 4.

The inner cylindrical drum 60 and the outer cylindrical drum 62 are depicted in an exploded view in FIG. 5. As may be seen from FIG. 5, the inner cylindrical drum 60 may have a generally solid construction in that it is not generally hollow along its rotational axis. The inner cylindrical drum 60 includes a flow aperture 64 passing through the inner cylindrical drum 60 perpendicular to its rotational axis. The flow aperture 64 is generally cylindrical in shape and permits flow of material passing through the rotary valve 40 through the inner cylindrical drum 60. Accordingly, the flow aperture 64 may be provided with a surface treatment adapted to withstand the environment to which it will be exposed (e.g., heat, pressure, the flow of petroleum product and/or catalyst), such as having a refractory lining, ceramic tiles, and/or a ceramic/metal composite structure thereon.

The flow aperture 64 has a diameter that is less than the diameter of the inner cylindrical drum 60. Typically, the flow aperture 64 has a diameter that is approximately equal to or slightly larger than the inner diameter of the pipeline to which the rotary valve 40 is attached, whereby when the rotary valve 40 is fully open, the rotary valve 40 provides essentially unrestricted flow of material through the flow aperture 64. The flow aperture 64 shown in FIG. 5 is shown as having a certain size relative to the size of the inner cylindrical drum 60, but the particular relative size of the flow aperture 64 to the inner cylindrical drum 60 can be varied. For example, to permit rotary valves 40 of a standard size to be used in existing FCCUs of varying sizes, the inner cylindrical drum 60 of FIG. 5 could be replaced with any of a variety of different inner cylindrical drums having a smaller flow apertures, thereby allowing the same valve body 46 to be used to provide desired flow control characteristics with differently sized FCCU pipelines.

The only components that require changing are the inner cylindrical drum 60 and the outer cylindrical drum 62, as will be discussed in further detail below.

The outer cylindrical drum 62, in contrast to the inner cylindrical drum 60, has a generally hollow construction, with a cylindrical bore 66 extending from a first, open end of the outer cylindrical drum 62 to a second, generally closed end 68 of the outer cylindrical drum 62. The outer cylindrical drum 62 includes an upper flow aperture 70 and a lower flow aperture 72, which are aligned with each other so as to pass through the outer cylindrical drum 62 perpendicular to its rotational axis. The upper flow aperture 70 and the lower flow aperture 72 are sized and placed to correspond to the size of the flow aperture 64 of the inner cylindrical drum 60, such that when the inner cylindrical drum 60 is nested within the cylindrical bore 66 of the outer cylindrical drum 62, the upper flow aperture 70, the flow aperture 64, and the lower flow aperture 72 may be substantially aligned to define a substantially uninterrupted flow path having a diameter that is approximately equal to or slightly larger than the inner diameter of the pipeline to which the rotary valve 40 is attached. Thus, the upper flow aperture 70, the flow aperture 64, and the lower flow aperture 72 may have a shared axis of symmetry when they are fully aligned in the rotary valve 40, though as the inner cylindrical drum 60 is rotated relative to the outer cylindrical drum 62 (or vice-versa), the respective axes of symmetry may become unaligned.

It should be noted that the inner cylindrical drum 60 and the outer cylindrical drum 62 may each have bisecting planes of symmetry essentially bisecting each of the cylindrical drums 60, 62. In other words, regardless of which direction the inner cylindrical drum 60 is rotated relative to the outer cylindrical drum 62 or regardless of which direction the outer cylindrical drum 62 is rotated relative to the inner cylindrical drum 60, a similar amount of relative rotation in either direction will impart a similar amount of change in the size of upper and lower openings of the flow path through the rotary valve 40. Similarly, one or both of the inner cylindrical drum 60 and the outer cylindrical drum 62 may be rotated one hundred eighty degrees while still functioning similarly. In other words, if the outer cylindrical drum 62 is rotated one hundred eighty degrees, the upper flow aperture 70 would function similarly as, now, the lower flow aperture 72, and vice-versa.

This rotational symmetry of the inner cylindrical drum 60 and of the outer cylindrical drum 62 provides superior wear functionality to the rotary valve 40. Specifically, as leading edges of the inner cylindrical drum 60 and/or the outer cylindrical drum 62 become worn during use, other leading edges can be used instead, first by rotating the inner cylindrical drum 60 and/or the outer cylindrical drum 62 in a direction opposite to that previously used, and then second by rotating the inner cylindrical drum 60 and/or the outer cylindrical drum 62 one hundred eighty degrees from its original position (and then using the inner cylindrical drum 60 and/or the outer cylindrical drum 62 in each of the two available directions). Effectively, the inner cylindrical drum 60 and/or the outer cylindrical drum 62 each have four available leading edges that can be used in flow control to provide superior wear characteristics to the rotary valve 40.

As with the flow aperture 64 of the inner cylindrical drum 60, the upper flow aperture 70 and the lower flow aperture 72 of the outer cylindrical drum 62 permit flow of material passing through the rotary valve 40 through the outer cylindrical drum 62. Accordingly, the upper flow aperture 70 and the lower flow aperture 72 may each be provided with a surface treatment adapted to withstand the environment to which it will be exposed (e.g., heat, pressure, the flow of petroleum product and/or catalyst), such as having a refractory lining, ceramic tiles, and/or a ceramic/metal composite structure thereon.

Figure 6:
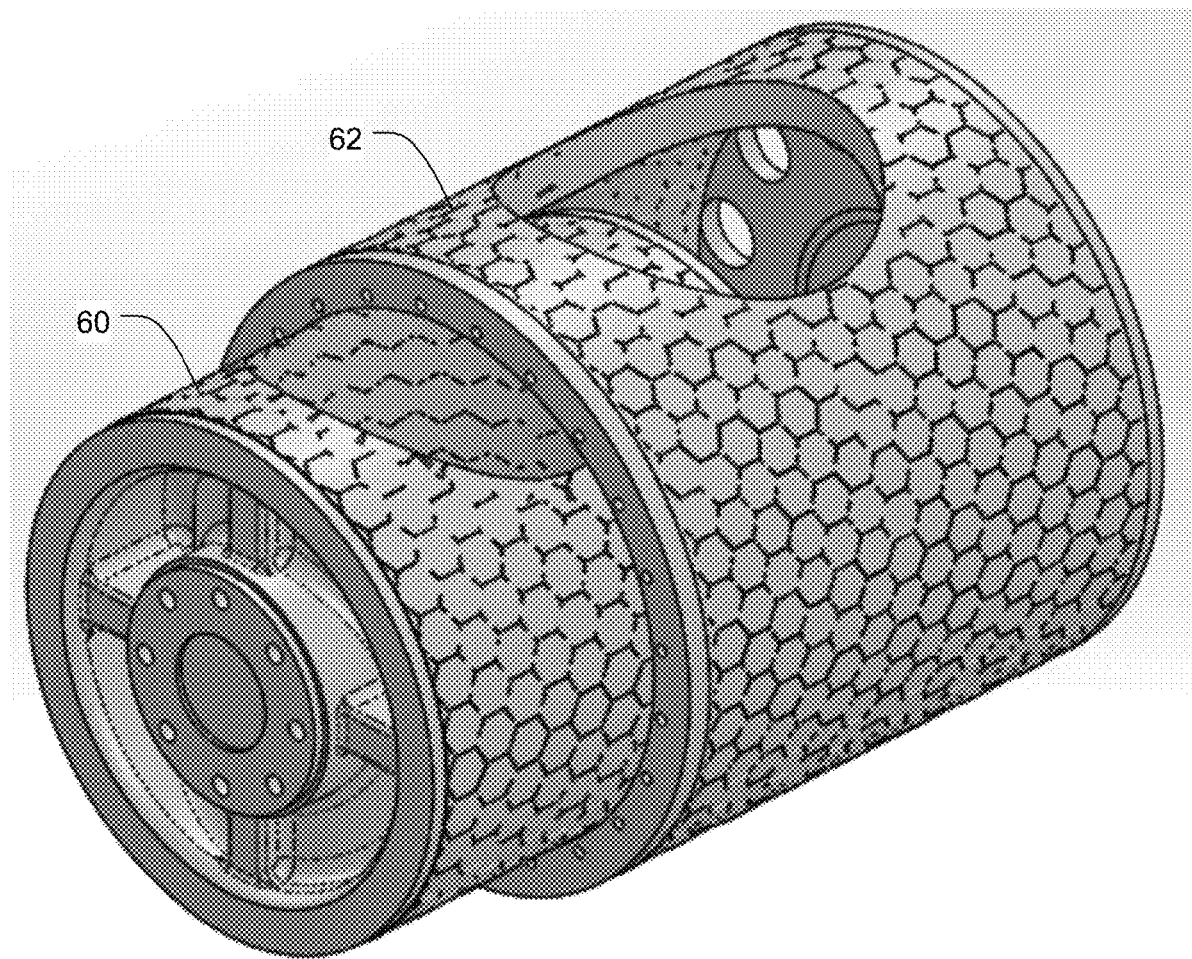
FIG. 6 shows a perspective view of the components of FIG. 5 partially nested.

The inner cylindrical drum 60 is adapted to nest and rotate within the cylindrical bore 66 of the outer cylindrical drum 62, as is illustrated in FIG. 6, which shows the inner cylindrical drum 60 partially nested within the outer cylindrical drum 62. Accordingly, the inner cylindrical drum 60 has a generally cylindrical outer surface 74 sized to generally contact the inner surface of the cylindrical bore 66. Similarly, the outer cylindrical drum 62 is adapted to nest and rotate within the body 46 of the rotary valve 40, as is illustrated in FIG. 4. Accordingly, the outer cylindrical drum 62 has a generally cylindrical outer surface 76 sized to generally contact the inner surface of the generally horizontal generally cylindrical portion of the body 46.

The inner surface of the body, the outer surface 76 of the outer cylindrical drum 62, the outer surface 74 of the inner cylindrical drum 60, and the inner surface of the cylindrical bore 66 may each be provided with a surface treatment adapted to minimize friction and wear between them, while withstanding the environment (e.g., heat, pressure, exposure to petroleum products, catalyst, and/or byproducts thereof, and changes to any of these) to which they will be subjected such that the inner cylindrical drum 60 and the outer cylindrical drum 62 can rotate relative to each other and/or to the body 46 of the rotary valve 40 for an anticipated life cycle without wearing out and without negatively impacting the ability of the rotary valve 40 to control flow therethrough. Accordingly, each of these surfaces may be provided with an applicable surface treatment, such as having a refractory lining, ceramic tiles, and/or a ceramic/metal composite structure thereon.

It should be noted that because the valves in the FCCU are generally never operated in a fully closed state, it is not necessarily necessary for the rotary valve 40 to be capable of achieving complete cessation of flow, even if in a fully closed position. Stated differently, a certain amount of latitude in size between the inner cylindrical drum 60 and the outer cylindrical drum 62 or between the outer cylindrical drum 62 and the body 46 and some accompanying leakage around or between the drums 60, 62 may be acceptable from a flow control perspective, especially as the valve 40 is subject to wear, though generally tight tolerances are anticipated to allow the rotary valve 40 and its components to be more resistant to wear.

Because the various surface treatments of the body 46, the outer cylindrical drum 62, and the inner cylindrical drum 60 may in some instances be relatively fragile in nature, the inner cylindrical drum 60 may be supported within the cylindrical bore 66, and the outer cylindrical drum 62 may be supported within the body 46 without the weight of the various components being borne by or on their more fragile surfaces. Accordingly, for example, as shown in FIG. 4, the inner cylindrical drum 60 may be fitted on one end with a support protrusion 78 that is adapted to be received in a corresponding support receptacle 80 attached to or formed on an inner surface of the closed end 68 of the outer cylindrical drum 62. At the other end, as shown in FIG. 5, the inner cylindrical drum 60 is provided with attachment points 82 to which the first shaft 56 may be attached and used to support the inner cylindrical drum 60 as well as to transfer rotational forces supplied to the first shaft 56 by the first electro-hydraulic rotator 52 to the inner cylindrical drum 60. Accordingly, the inner cylindrical drum 60 is rotatably supported on both ends within the outer cylindrical drum 62.

Similarly, the outer cylindrical drum 62 is rotatably supported on both ends within the body 46. As may be seen in FIG. 4, the outer cylindrical drum 62 is attached at the closed end 68 to the second shaft 58, via a plate 84 that extends radially from the second shaft 58 and the support receptacle 80 to the outer edge of the outer cylindrical drum 62. The second shaft 58 may be attached to the outer cylindrical drum 62 via attachment points (not shown) that are similar to the attachment points 82 of the inner cylindrical drum 60. Such attachment points allow the second shaft 58 to support the outer cylindrical drum 62 and also to transfer rotational forces supplied to the second shaft 58 by the second electrohydraulic rotator 54 to the outer cylindrical drum 62.

Figure 7:
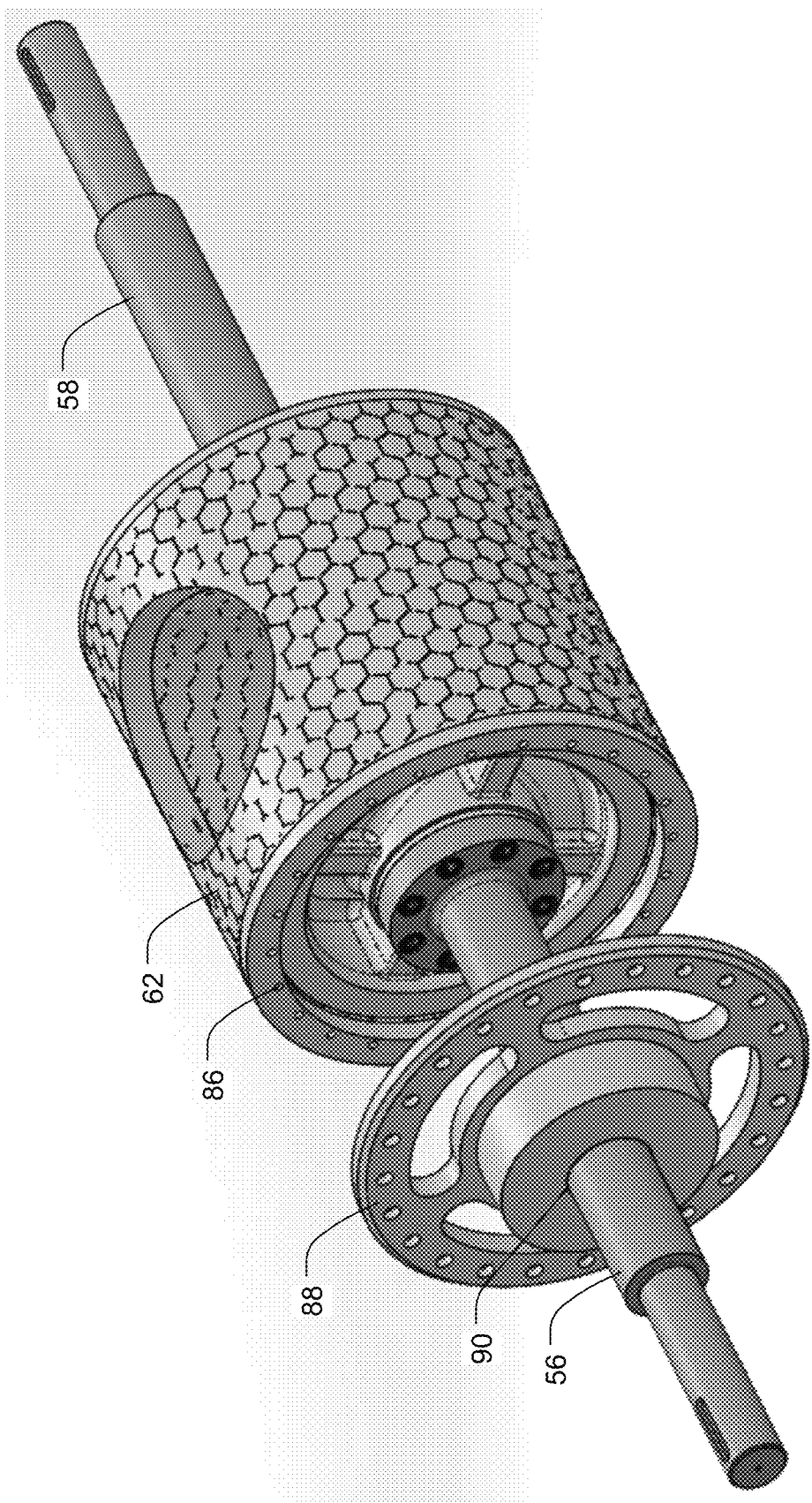
FIG. 7 shows a perspective view of the components of FIG. 5 fully nested and with additional components of the rotary valve of FIG. 4 affixed thereto.

At the other end of the outer cylindrical drum 62, the outer cylindrical drum 62 is provided with attachment points 86 to which a support plate 88 may be secured. FIG. 7 shows a partially exploded view of the inner components of the rotary valve 40, with the inner cylindrical drum 60 fully nested within the outer cylindrical drum 62, and with the first shaft 56 attached to the inner cylindrical drum 60, and the second shaft 58 attached to the outer cylindrical drum 62. In this view, the support plate 88 is shown detached from the outer cylindrical drum 62 and partially withdrawn along the first shaft 56. As may be seen, the support plate 88 includes a central aperture 90 that is sized to receive the first shaft 56 therein so as to permit the first shaft 56 to rotate within the central aperture 90. In this way, the support plate 88 and the attached outer cylindrical drum 62 can rotate together as a unit relative to the inner cylindrical drum 62 (or vice-versa), while the outer cylindrical drum 62 is supported on the end proximate the first shaft 56 by the combination of the support plate 88 and the first shaft 56.

One result of this design of the drums 60, 62 and their accompanying parts is that the drums 60, 62 may be assembled as a drum unit during assembly of the rotary valve 40, and may be inserted as a complete drum unit into the valve body 46. One method of assembly of the rotary valve 40 is illustrated in FIGS. 5-13. As illustrated in FIGS. 5-6, assembly begins by bringing the prepared inner cylindrical drum 60 and the prepared outer cylindrical drum 62 together, and then inserting the inner cylindrical drum 60 within the cylindrical bore 66 of the outer cylindrical drum 62 until the support protrusion 78 of the inner cylindrical drum 60 is received within the support receptacle 80 of the outer cylindrical drum 62.

Figure 8:
FIG. 8 shows a perspective view of components of the rotary valve of FIG. 4 in a stage of partial assembly.

At this point, as illustrated in FIG. 7, the first shaft 56 may be attached to the inner cylindrical drum 60 and the second shaft 58 may be attached to the outer cylindrical drum 62. Then, the support plate 88 is passed over the first shaft 56, with the central aperture 90 receiving the first shaft 56 therein, and the support plate 88 is affixed to the outer cylindrical drum 62 at the attachment points 86. At this stage, the first shaft 56, the second shaft 58, the inner cylindrical drum 60, the outer cylindrical drum 62, and the support plate 88 form a complete drum assembly 92, as shown in FIG. 8.

Figure 9:
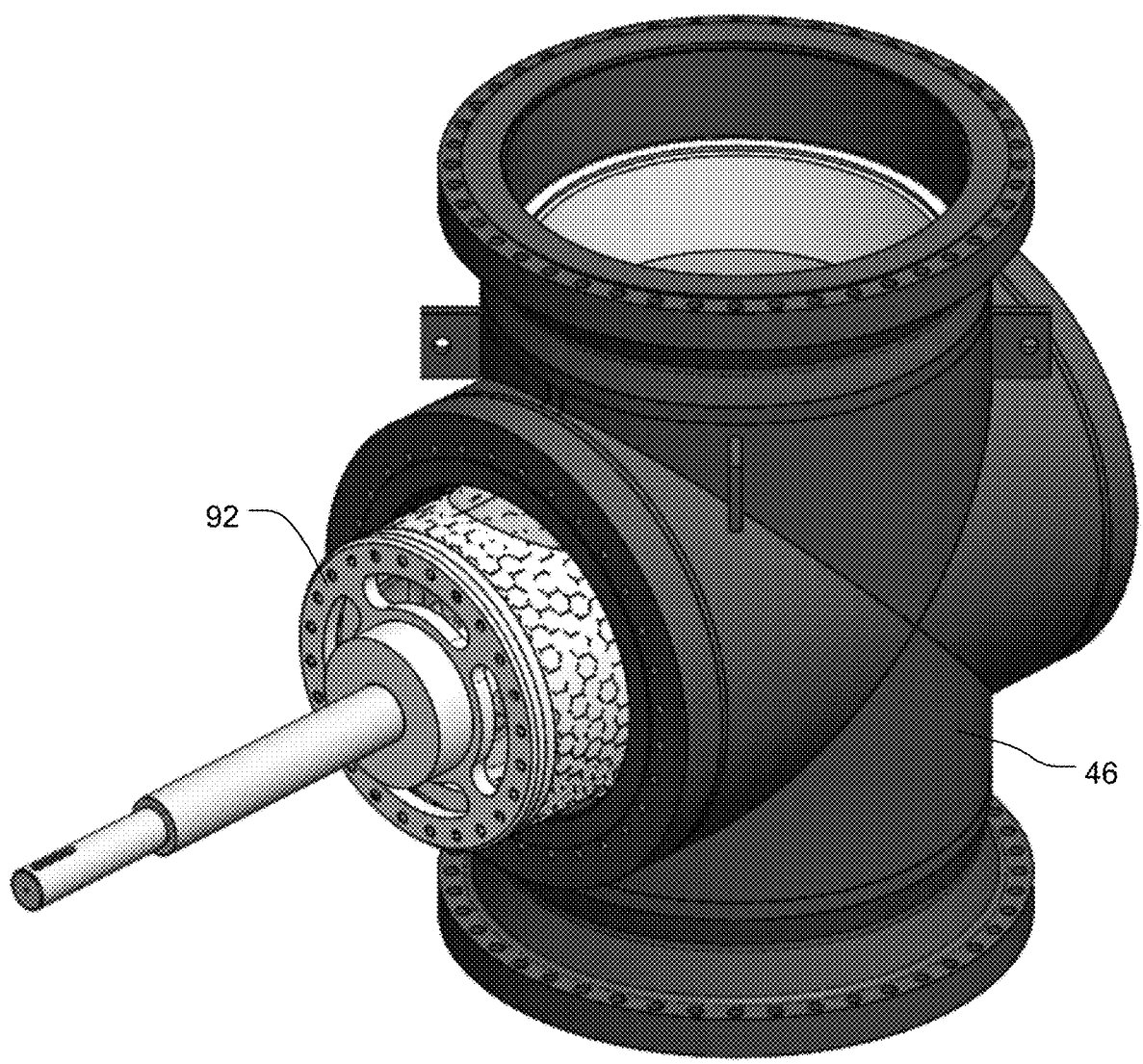
FIG. 9 shows a perspective view of components of the rotary valve of FIG. 4 in a stage of partial assembly.
Figure 10:
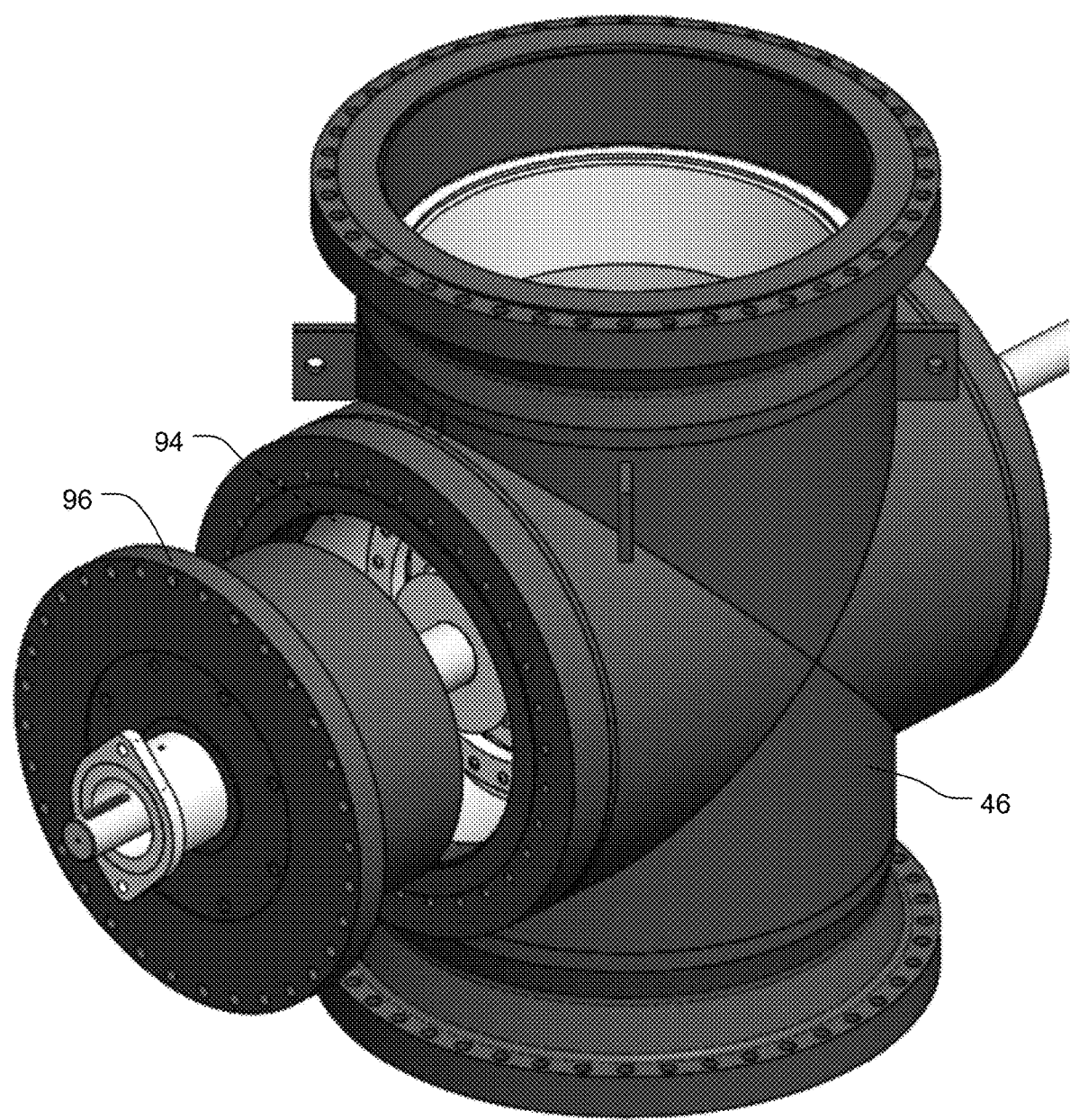
FIG. 10 shows a perspective view of components of the rotary valve of FIG. 4 in a stage of partial assembly.

The drum assembly 92 may then be inserted into the valve body 46 through a drum assembly aperture 94 provided on one side of the body 46. Because the drum assembly 92 can be assembled outside the body 46, the body 46 only requires a single drum assembly aperture 94, and the other side of the body 46 only requires a second shaft aperture (not shown) of sufficient size to permit passage of the second shaft 58 therethrough. Thus, as the drum assembly 92 is inserted into the body 46 as shown in FIG. 9, the second shaft 58 passes through the second shaft aperture of the body 46 until the drum assembly 92 is fully seated within the body 46, as shown in FIG. 10. Whereupon, a bonnet 96 may be placed over the first shaft 56 as also shown in FIG. 10, and the bonnet 96 may be affixed to the body 46 so as to seal the drum assembly aperture 94. As is known in the art, appropriate bearings, gland packings, and gland followers may be used to achieve a desired seal around the remaining openings through which pass the first shaft 56 and the second shaft 58.

Figure 11:
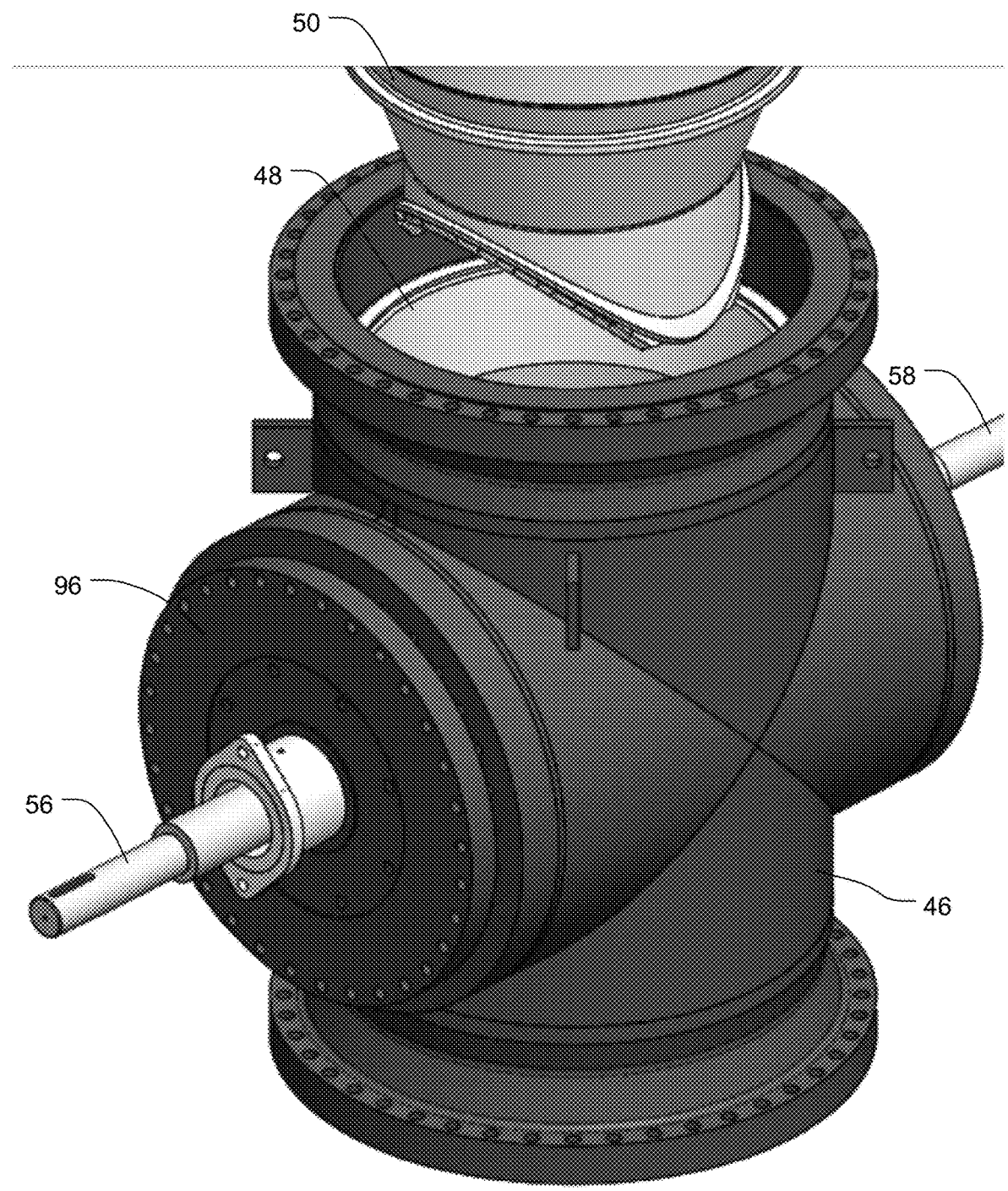
FIG. 11 shows a perspective view of components of the rotary valve of FIG. 4 in a stage of partial assembly.
Figure 12:
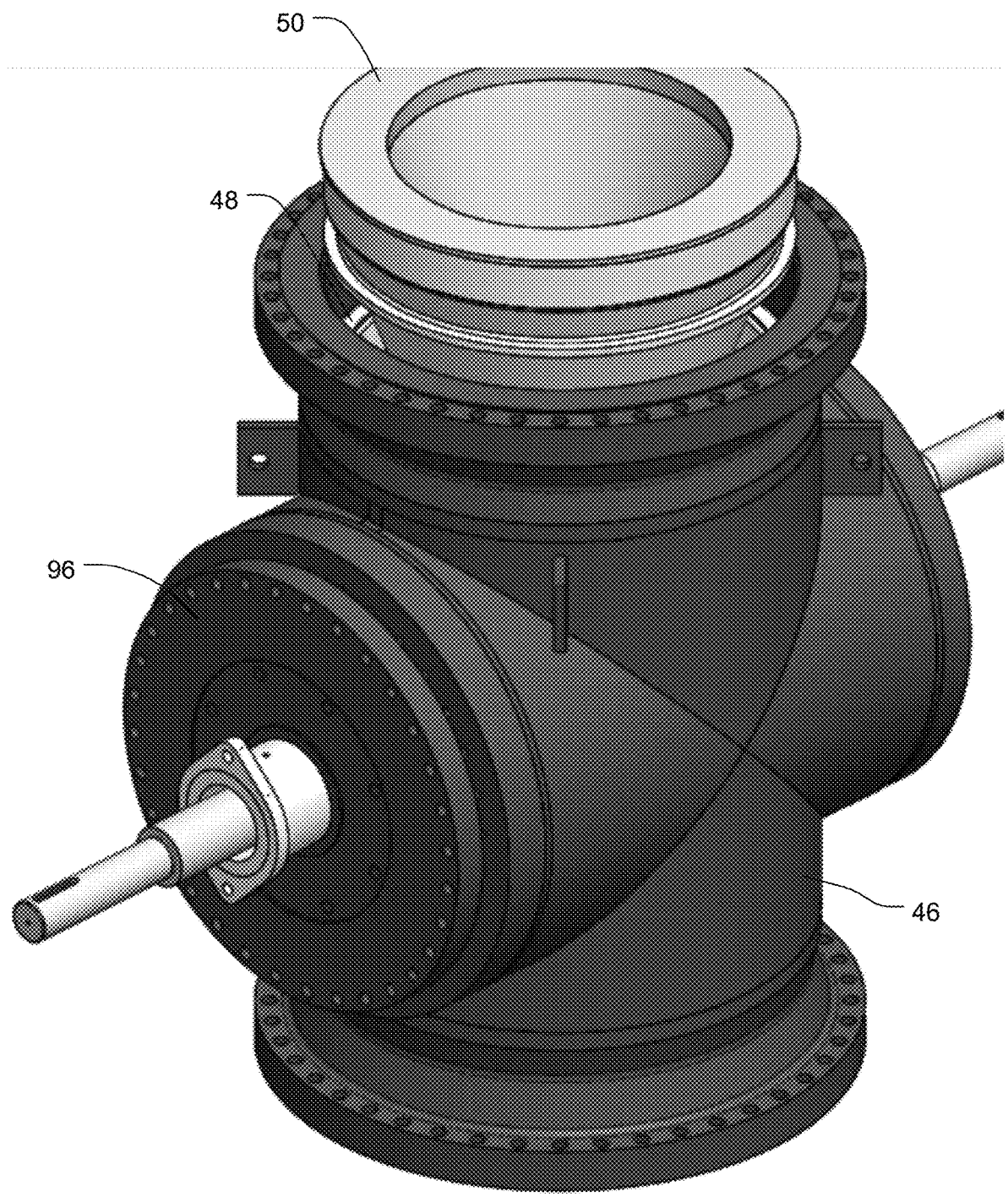
FIG. 12 shows a perspective view of components of the rotary valve of FIG. 4 in a stage of partial assembly.
Figure 13:
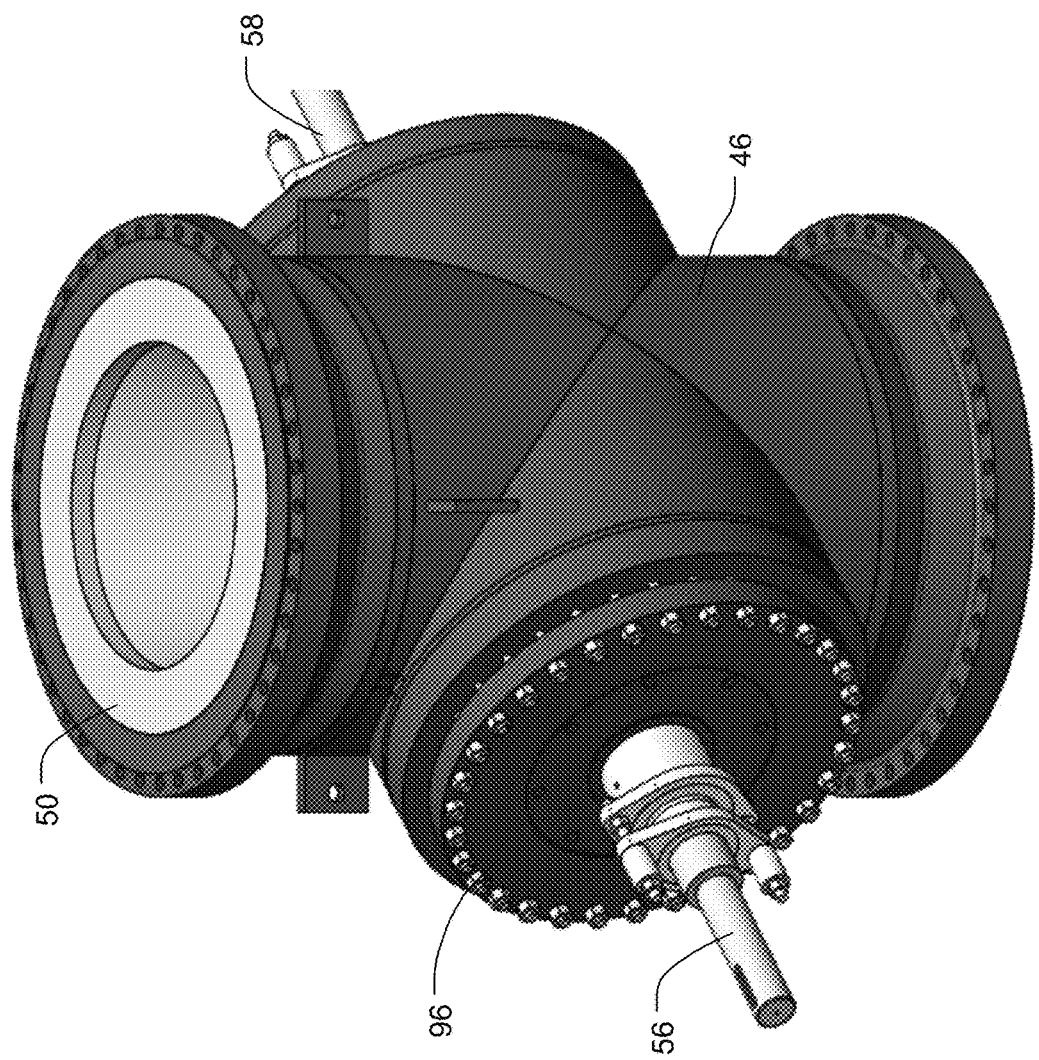
FIG. 13 shows a perspective view of components of the rotary valve of FIG. 4 in a stage of partial assembly.
Figure 13:
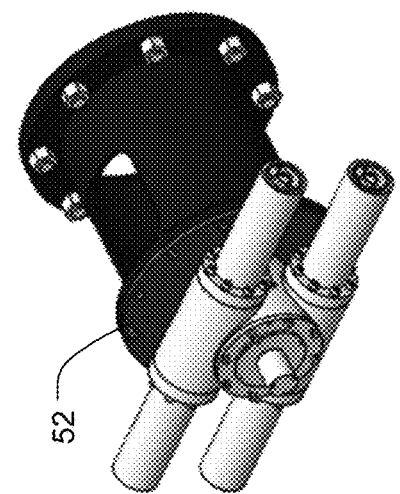

Once the drum assembly is secured within the body 46 and the bonnet 96 is affixed to the body, the refractory cone 50 may be set into the upper inlet area 48, as shown in FIGS. 11 and 12. As may be seen in FIG. 11, the lower portion of the refractory cone 50 may be shaped to correspond to the outer surface of the outer cylindrical drum 62. As discussed above, the rotary valve may be used with FCCU's having smaller pipeline sizes by reducing the size of the flow aperture 64 of the inner cylindrical drum 60 and the upper flow aperture 70 and the lower flow aperture 72 of the outer cylindrical drum 62, without modifying the overall size of the valve body 46, the inner cylindrical drum 60, and the outer cylindrical drum 62; however, it may also be desirable to correspondingly reduce the inner diameter of the refractory cone 50 as well. In any event, once the refractory cone 50 is in place, the valve 40 may be attached to the FCCU pipeline by securing the top flange 42 and the bottom flange 44 to corresponding flanges attached to the FCCU pipeline above and below the valve 40. Thereafter, as illustrated in FIG. 13 with the first electro-hydraulic rotator 52, the first electro-hydraulic rotator 52 and the second electro-hydraulic rotator 54 may be attached to the first shaft 56 and the second shaft 58, respectively. Alternatively, the first electro-hydraulic rotator 52 and the second electro-hydraulic rotator 54 may be attached to the first shaft 56 and the second shaft 58, respectively, before the valve 40 is attached to the FCCU pipeline.

Disassembly of the rotary valve 40 may proceed by reversing the steps outlined above.

Figure 14:
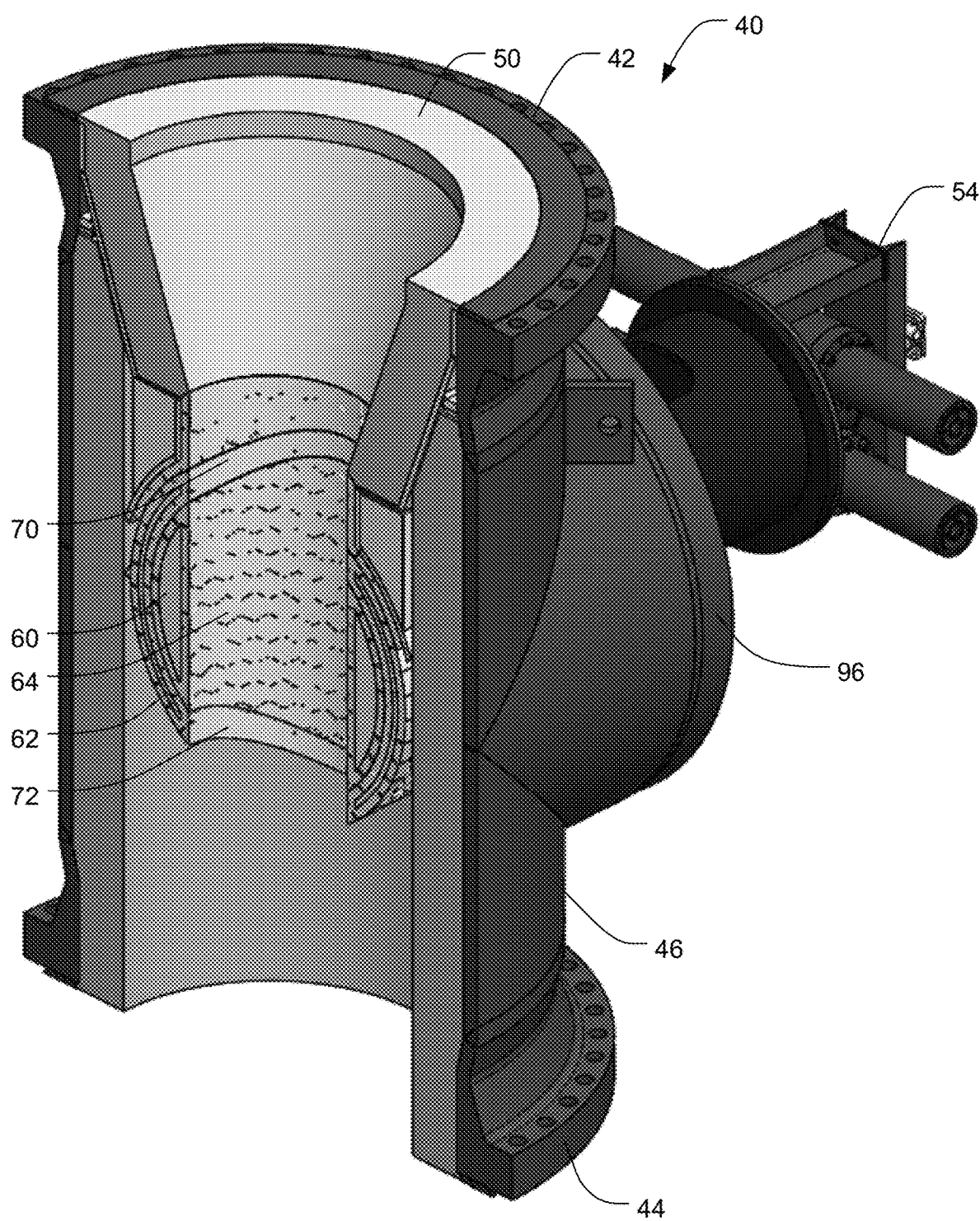
FIG. 14 shows a perspective view of a the rotary valve of FIG. 4 sectioned orthogonally to the section of FIG. 4.

FIG. 14 shows a perspective view of the fully assembled rotary valve 40 sectioned orthogonally to the section of FIG. 4. This view serves to show how the refractory cone 50, flow aperture 64 of the inner cylindrical drum 60 and the upper flow aperture 70 and the lower flow aperture 72 of the outer cylindrical drum 62 together serve to form a material flow path through the rotary valve 40.

Figure 15:
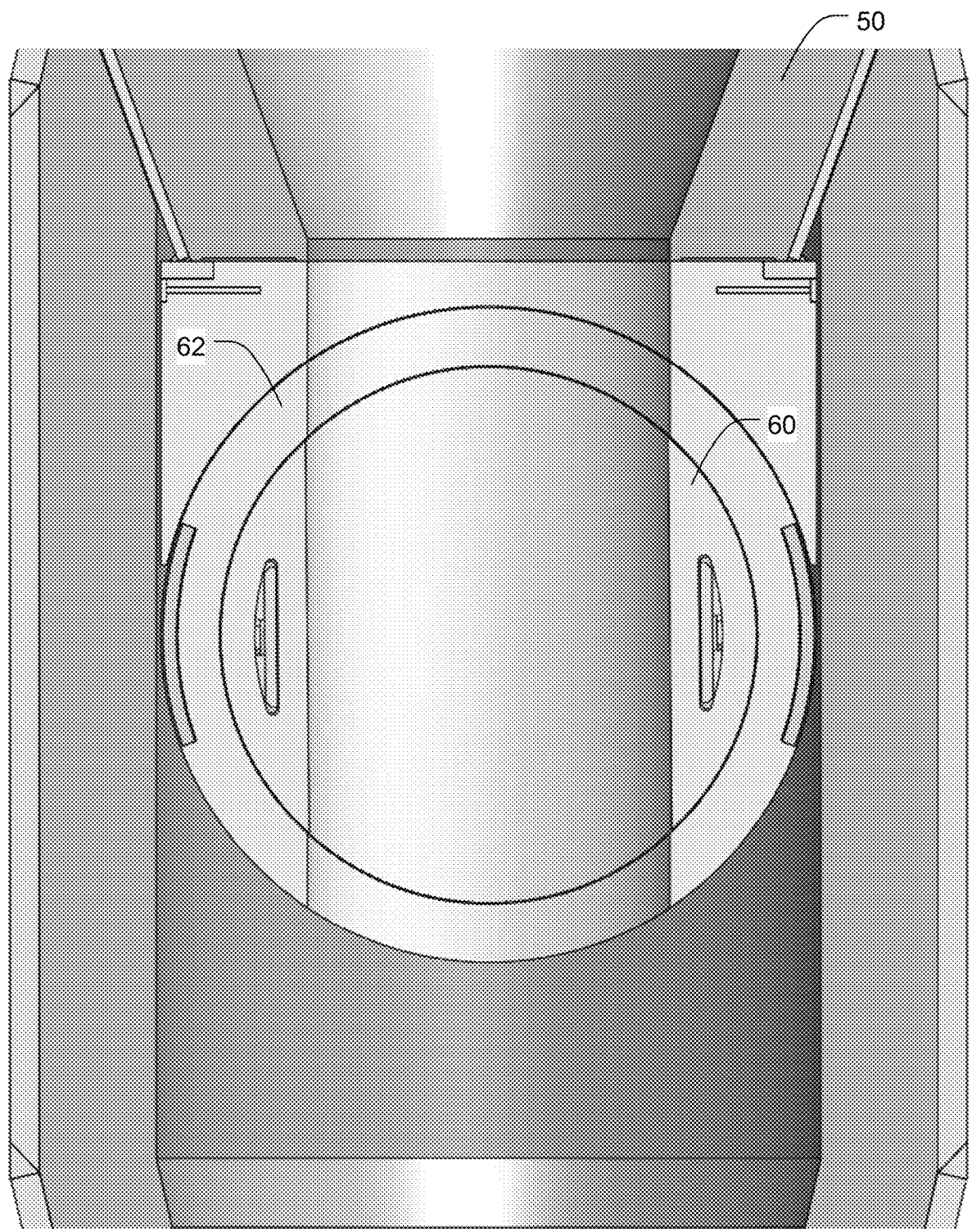
FIGS. 15-24 show sectional views of the rotary valve of FIG. 4 at various rotational angle of rotating components of the rotary valve.
Figure 16:
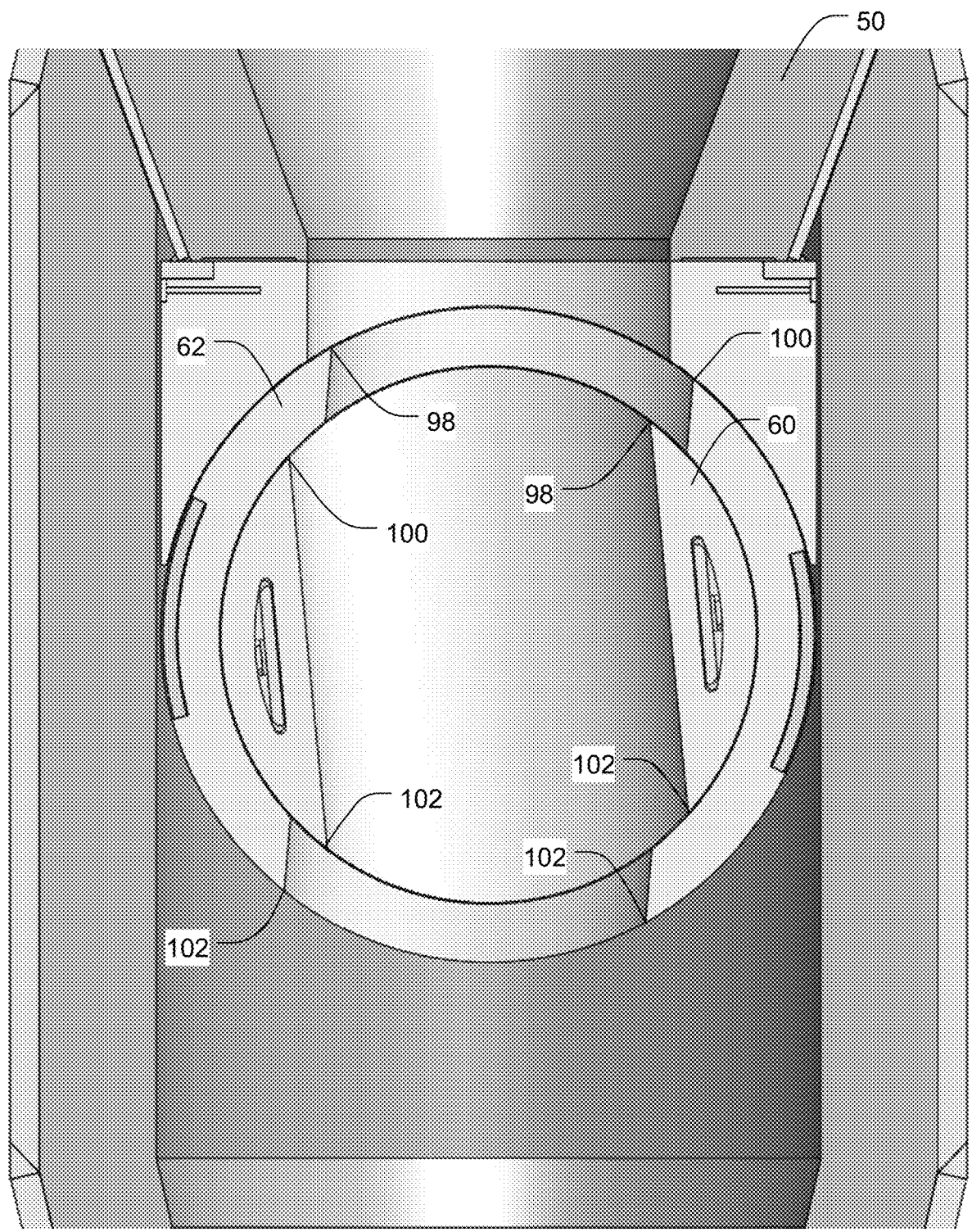
Figure 17:
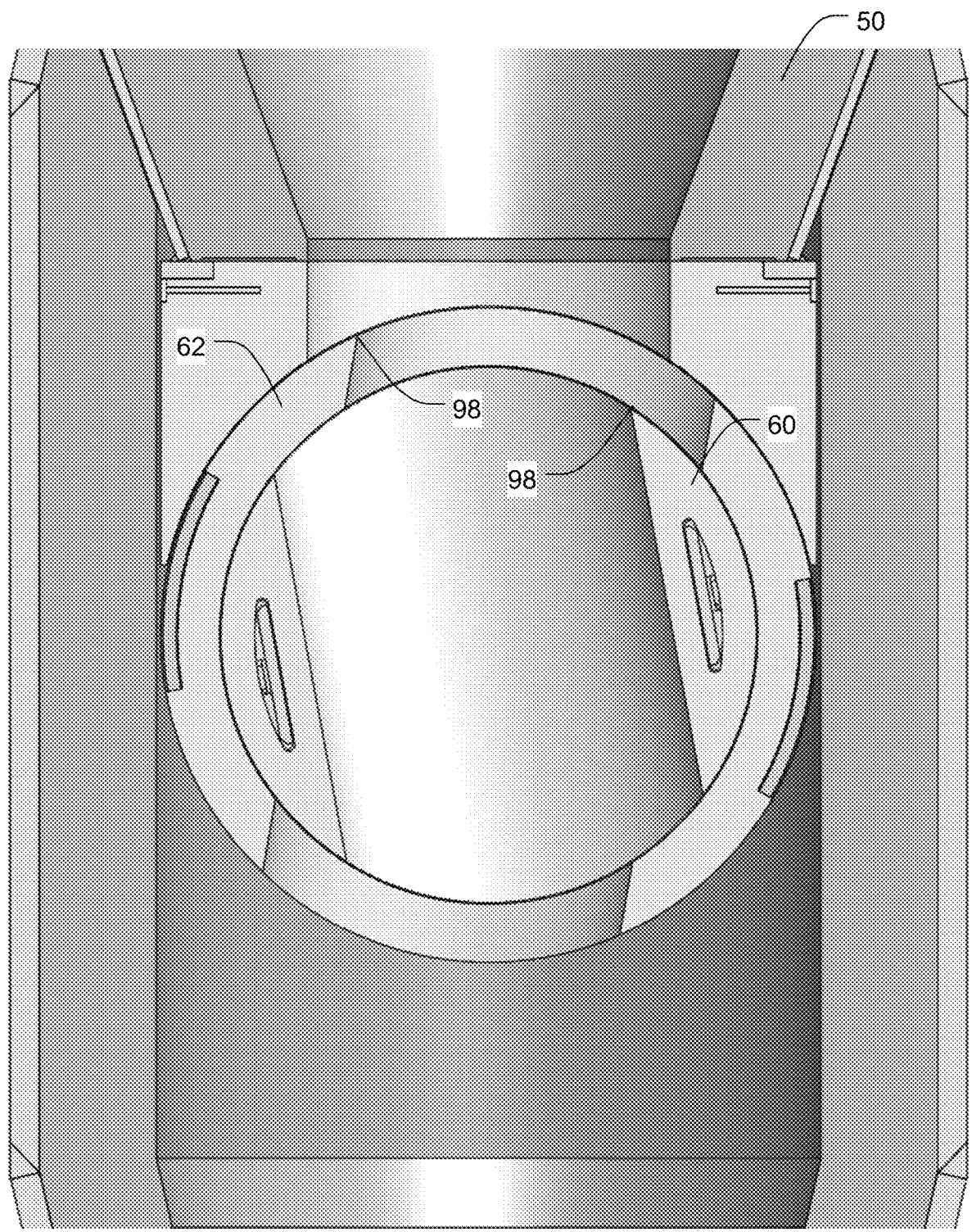
Figure 18:
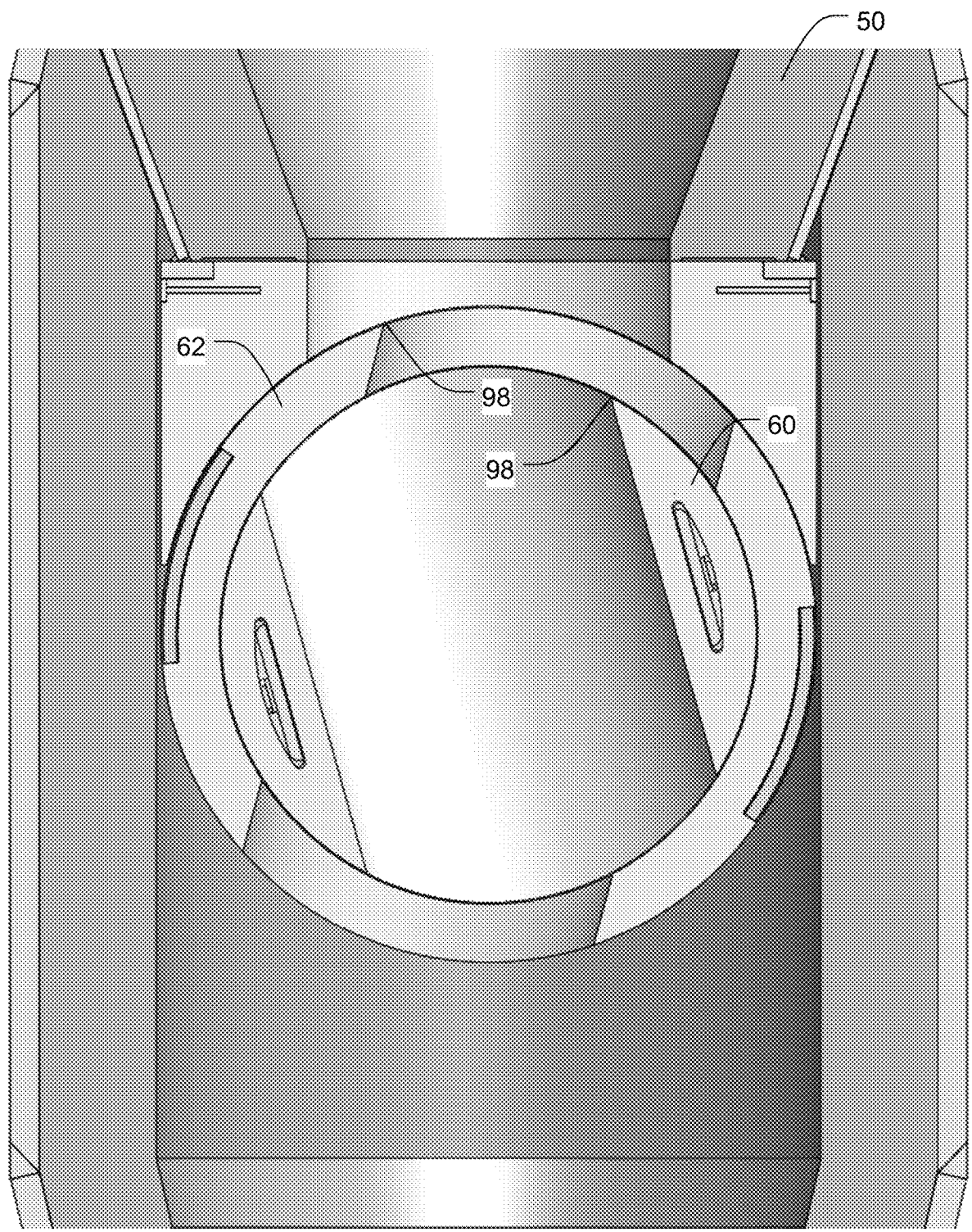
Figure 19:
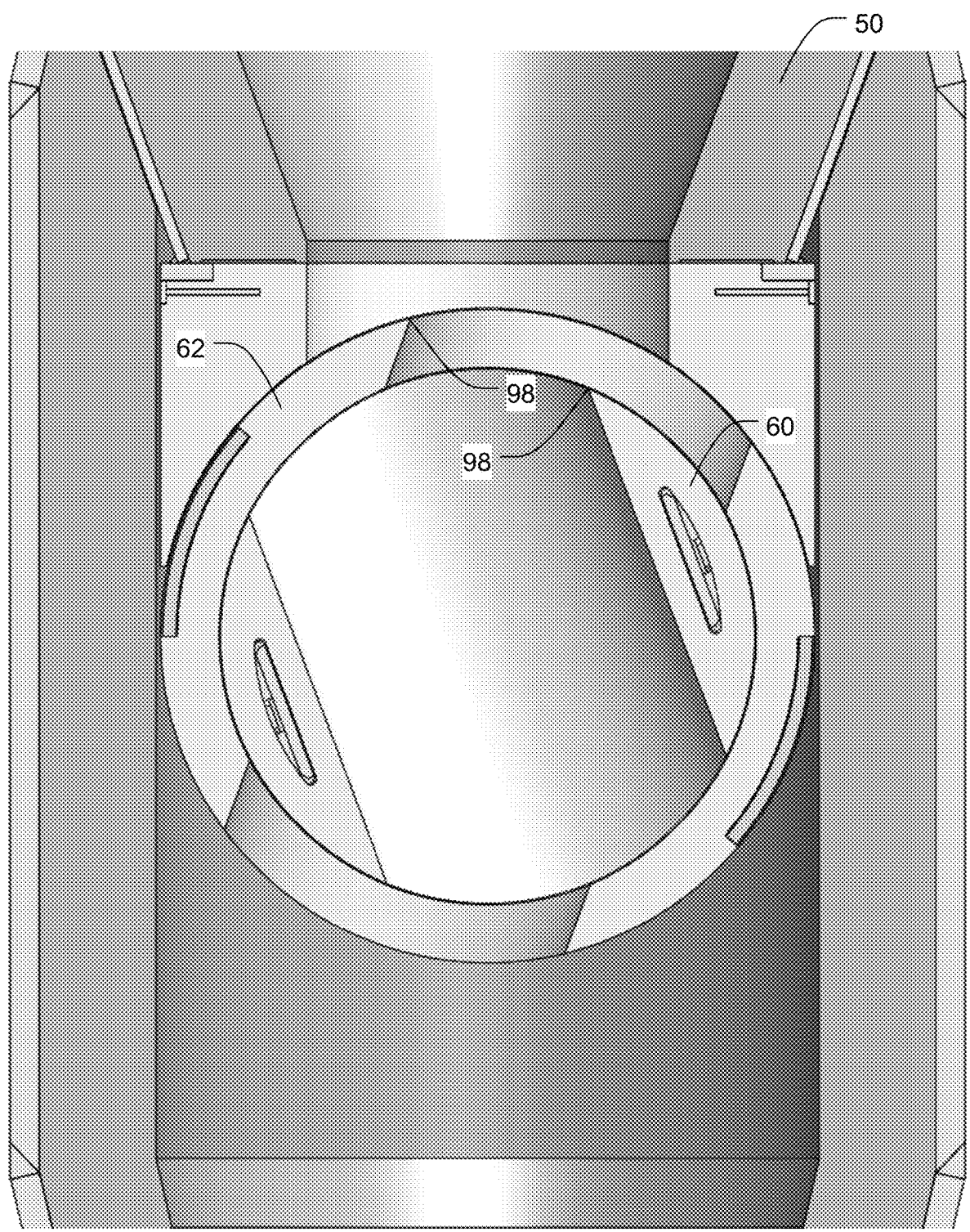
Figure 20:
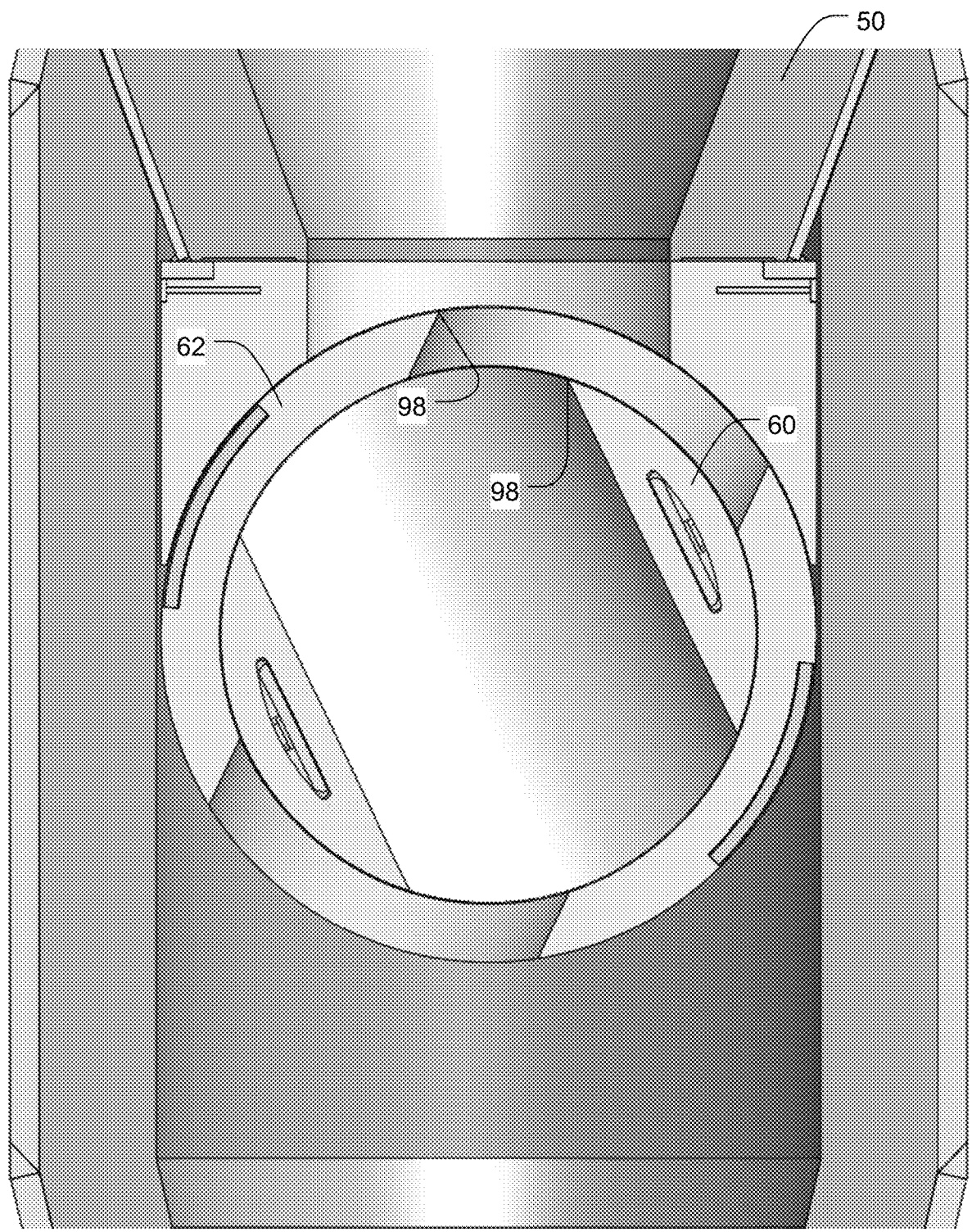
Figure 21:
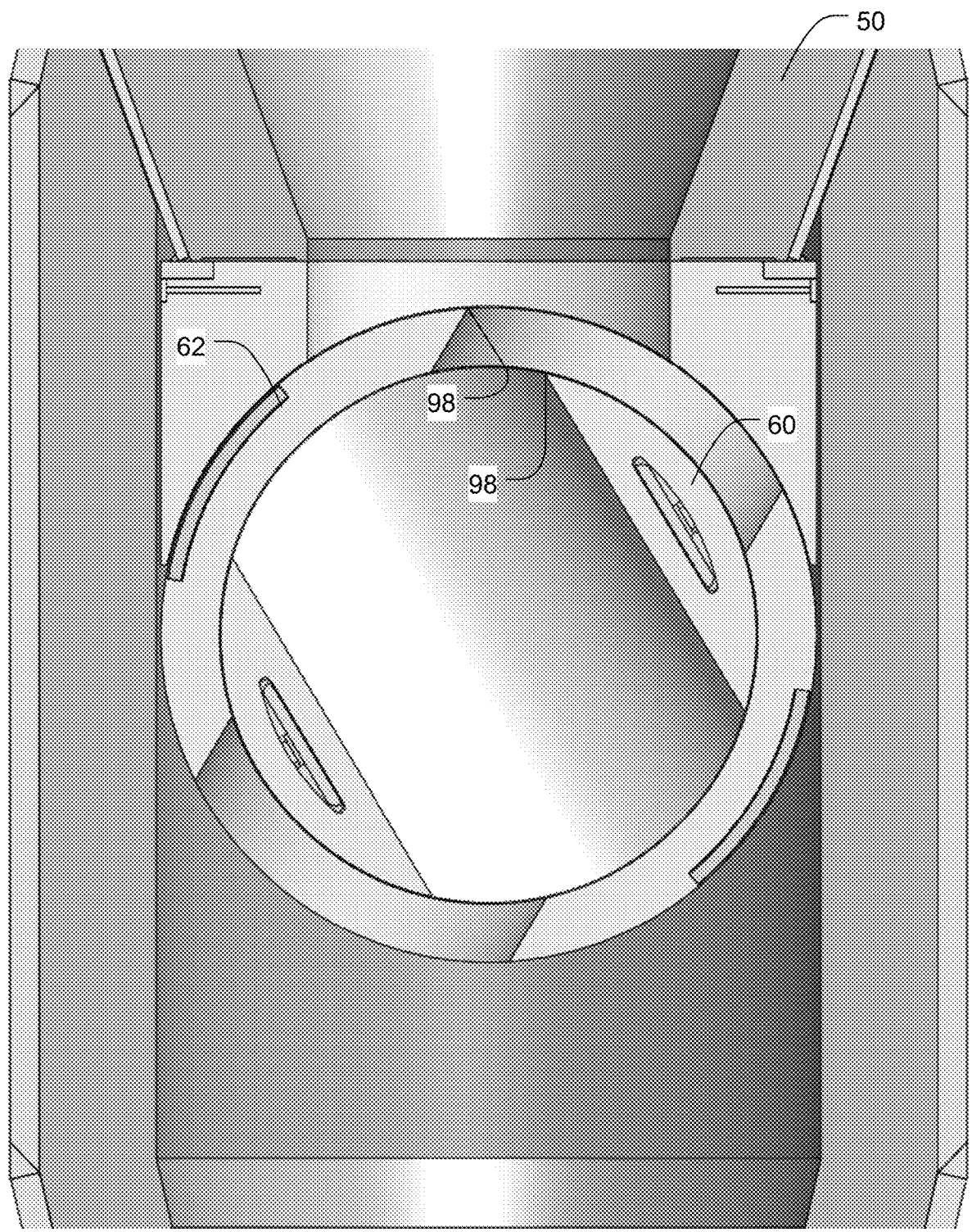
Figure 22:
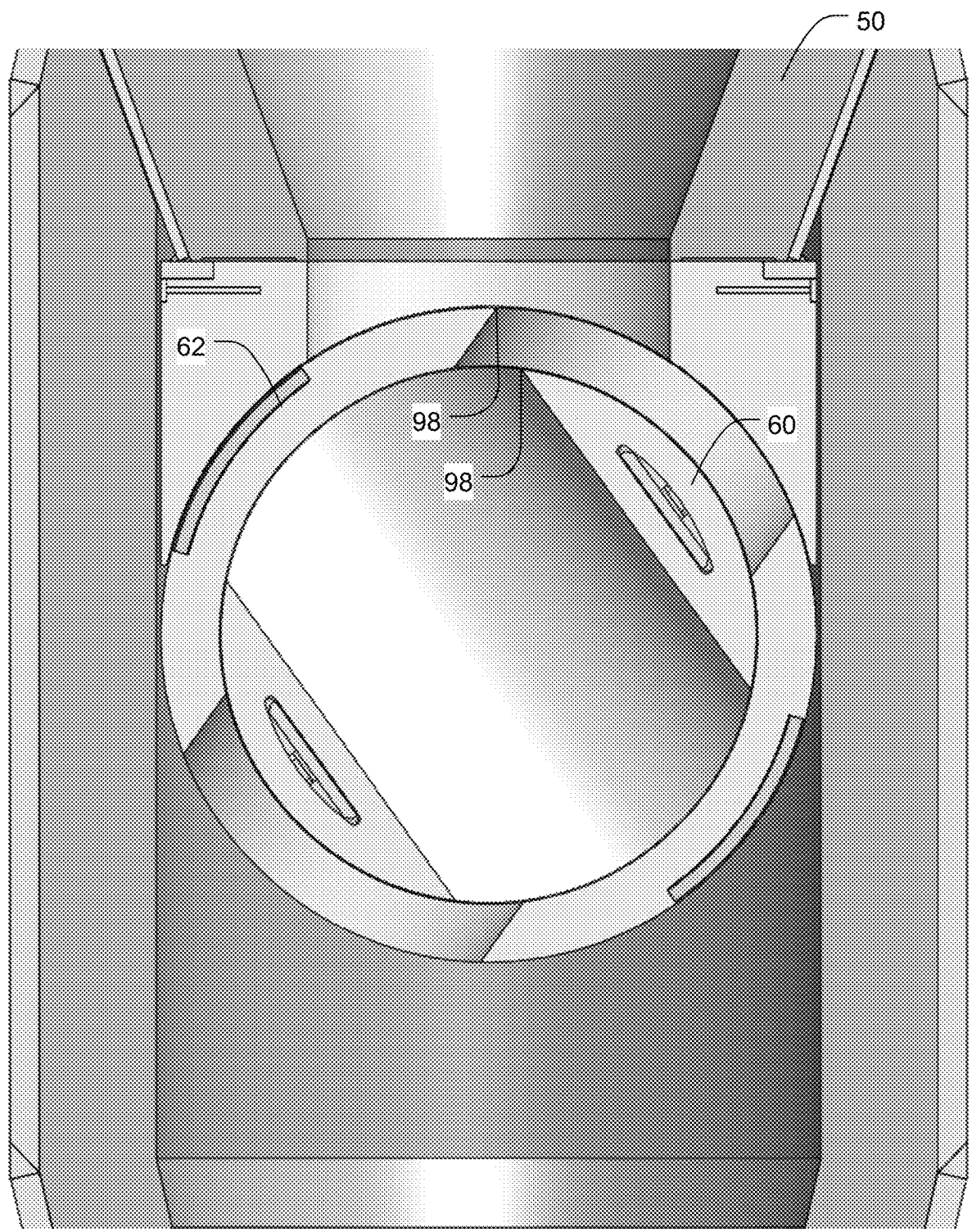
Figure 23:
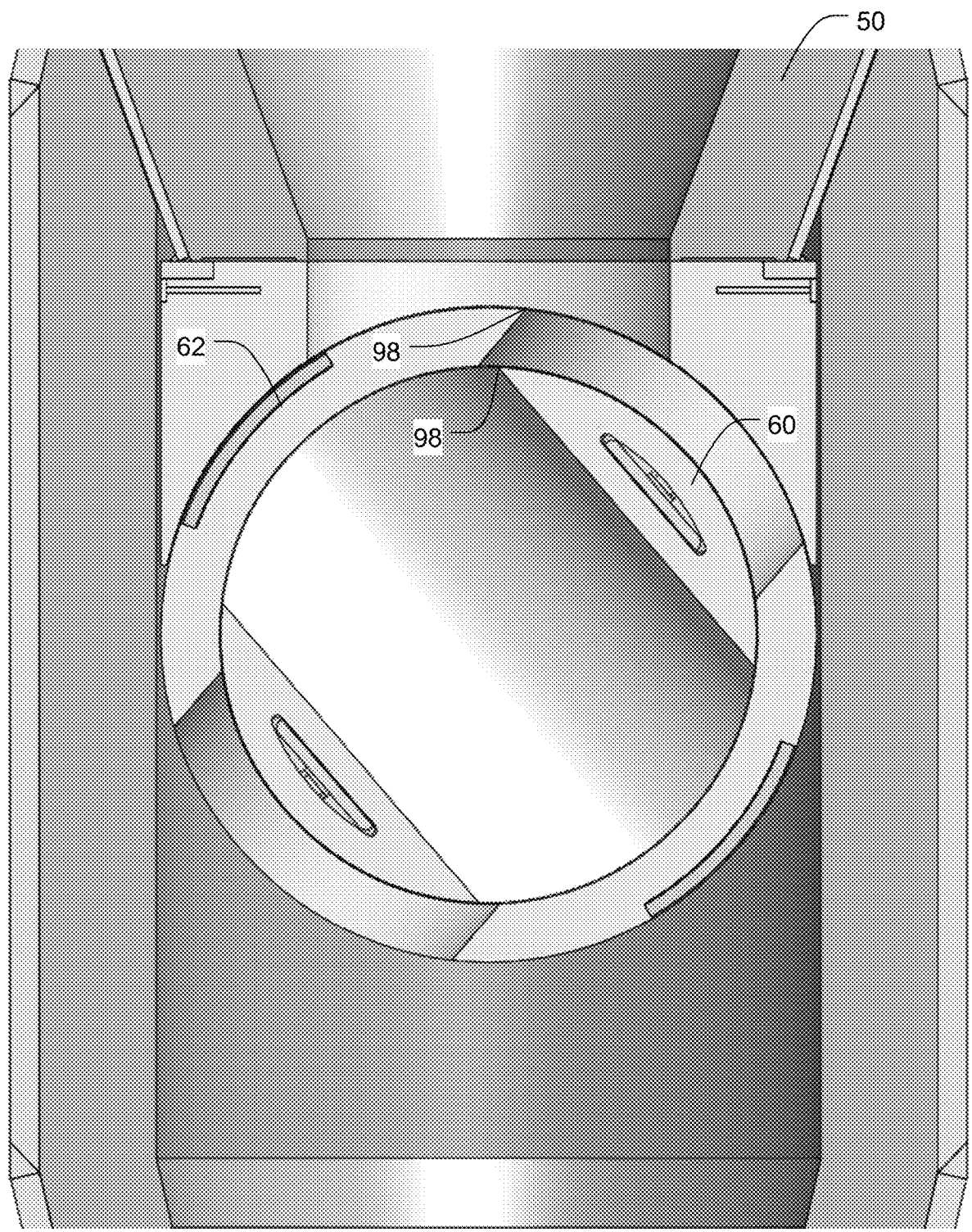
Figure 24:
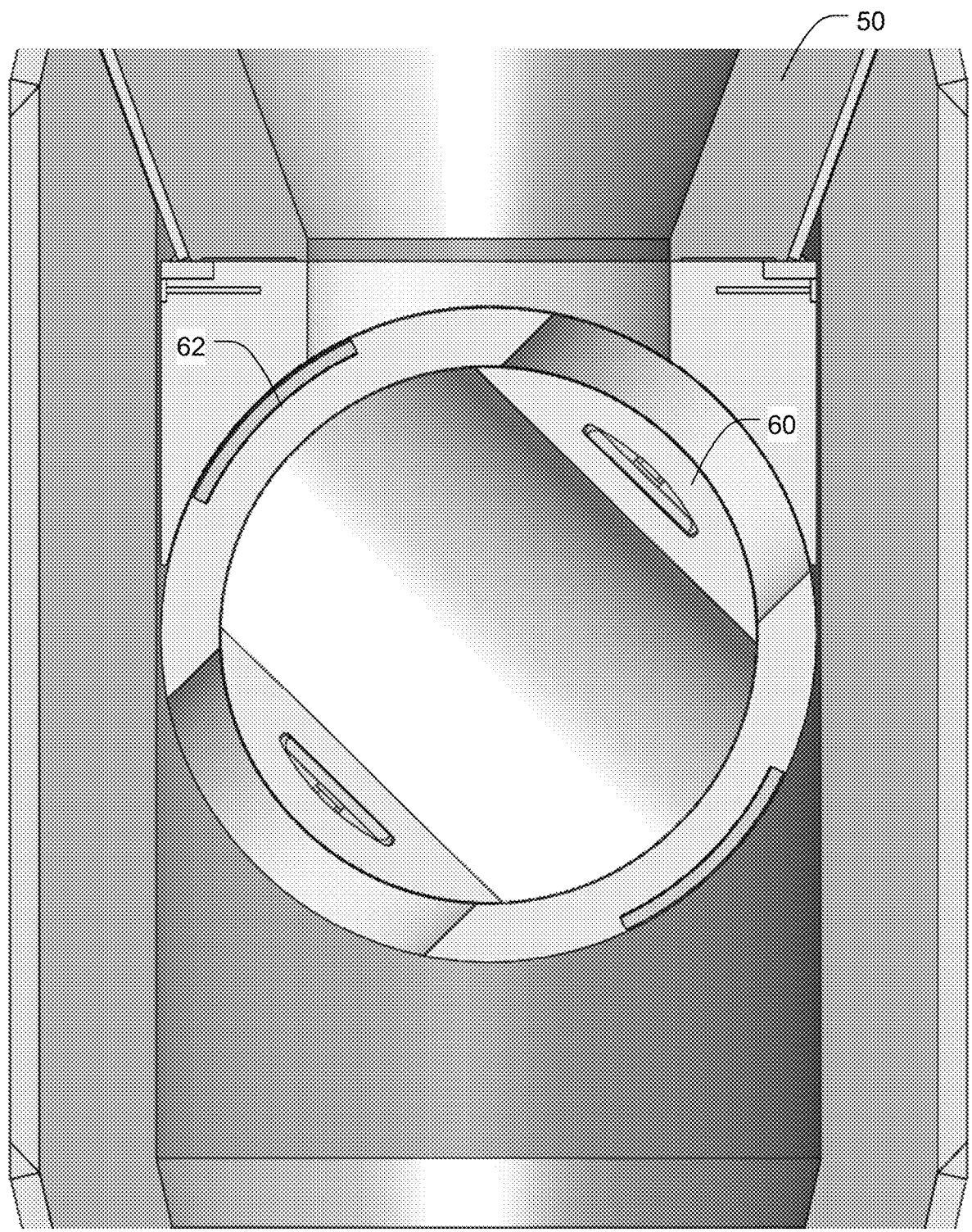

FIGS. 15-24 show a sectional view of the rotary valve 40 taken along the same section shown in FIG. 14. These Figures show how the inner cylindrical drum 60 and the outer cylindrical drum 62 can counter-rotate to provide flow control with the rotary valve 40. FIG. 15 shows the rotary valve 40 in its fully open state, in which the flow paths of each of the drums 60, 62 is completely vertical, and each subsequent Figure shows the inner cylindrical drum 60 and the outer cylindrical drum 62 rotated an additional five degrees as opposed to the immediate prior Figure. Accordingly, FIG. 16 shows the drums 60, 62 rotated with their respective flow paths five degrees from vertical in opposite directions, FIG. 17 shows the drums 60, 62 rotated with their respective flow paths ten degrees from vertical in opposite directions, FIG. 18 shows the drums 60, 62 rotated with their respective flow paths fifteen degrees from vertical in opposite directions, FIG. 19 shows the drums 60, 62 rotated with their respective flow paths twenty degrees from vertical in opposite directions, FIG. 20 shows the drums 60, 62 rotated with their respective flow paths twenty-five degrees from vertical in opposite directions, FIG. 21 shows the drums 60, 62 rotated with their respective flow paths thirty degrees from vertical in opposite directions, FIG. 22 shows the drums 60, 62 rotated with their respective flow paths thirty-five degrees from vertical in opposite directions, FIG. 23 shows the drums 60, 62 rotated with their respective flow paths forty degrees from vertical in opposite directions, and FIG. 24 shows the drums 60, 62 rotated with their respective flow paths forty-five degrees from vertical in opposite directions. It will be appreciated, of course, that either or both of the inner cylindrical drum 60 and the outer cylindrical drum 62 may be rotated to any intervening rotational position desired to provide a desired flow characteristic of the flow path.

As the inner cylindrical drum 60 and the outer cylindrical drum 62 counter-rotate, a leading edge 98 of each drum 60, 62 is more fully exposed to the material flowing through the FCCU pipeline, and the leading edges 98 become subject to more wear. Meanwhile, the edges 100 of each drum 60, 62 (identified in FIG. 16) that are across their respective openings from the leading edges 98 are relatively protected and are thus subject to less wear than the leading edges 98. Similarly, the lower edges 102 of each drum 60, 62 (also identified in FIG. 16) are also subject to less wear than the leading edges 98. Accordingly, the more protected edges 100, 102 may later become leading edges 98 by way of rotating the inner cylindrical drum 60 and/or the outer cylindrical drum 62 in a direction opposite to those shown in FIGS. 16-24, or by rotating the inner cylindrical drum 60 and/or the outer cylindrical drum 62 one hundred eighty degrees from the position shown in FIG. 15 and then rotating each drum 60, 62 in the manner shown in FIGS. 16-24 and/or in the opposite directions. Thus, the symmetry of the inner cylindrical drum 60 and the outer cylindrical drum 62 provide mechanisms by which the rotary valve 40 can better deal with wear over time.

Even when wear occurs, the rotary valve 40 can be adjusted to compensate for such wear and to achieve desired flow control of the valve by simply modifying the counter-rotation of the inner cylindrical drum 60 and the outer cylindrical drum 62 to account for wear of the leading edges 98. For this additional reason, the rotary valve 40 is highly resistant to loss of functionality due to wear, and will provide additional savings to refinery operators.

As may be seen in FIGS. 15-24, as the inner cylindrical drum 60 and the outer cylindrical drum 62 are rotated, upper and lower openings of the material flow path are relatively quickly restricted, and the flow path through the inner cylindrical drum 60 and the outer cylindrical drum 62 becomes more convoluted. The combination of these effects provides significant flow control capabilities to the rotary valve 40. Additionally, even though it is anticipated that the rotary valve 40 will not typically be used in a completely off position (e.g., FIG. 24) it may be noted from FIGS. 15-24 that flow is essentially completely interrupted in the rotary valve 45 with only forty-five degrees of counter-rotation between the inner cylindrical drum 60 and the outer cylindrical drum 62. It should be noted that in instances where the upper flow aperture 70, the flow aperture 64, and the lower flow aperture 72 are reduced in size to comport with the FCCU pipeline inner diameter, complete interruption of flow will be achieved with even less counter-rotation of the inner cylindrical drum 60 and the outer cylindrical drum 62. Thus, relatively minimal counter-rotation required to modify the flow control allows the rotary valve 40 to be operated with minimal input fluid or power, reducing the operating machinery needed to operate the rotary valve 40 as discussed above.

The rotary valve 40 may include appropriate sensory and signaling features so as to convey to the operator the status of the valve 40, the inner cylindrical drum 60, and the outer cylindrical drum. For example, electronic feedback sensors or other apparatus may inform a control system that the inner cylindrical drum 60 and the outer cylindrical drum 62 are each at an angle of, for example, twenty-two degrees from the full-open flow path. The control system may use such information to adjust each of the inner cylindrical drum 60 and the outer cylindrical drum 62. Additionally or alternatively, the control system may optionally use information received about the inner cylindrical drum 60 and the outer cylindrical drum 62 to ensure that the inner cylindrical drum 60 and the outer cylindrical drum 62 are each rotated equal amounts at whatever angle they are rotated.

In addition to or alternatively to the electronic or other sensors included in the rotary valve 40 to provide information regarding the positions of the inner cylindrical drum 60 and the outer cylindrical drum 62, physical markings may be provided to portions of the rotary valve 40 to permit rapid physical visual inspection of the positions of the inner cylindrical drum 60 and the outer cylindrical drum 62. For example, markings may be made to visual portions of the first shaft 56, the second shaft 58, the first electro-hydraulic rotator 52, and/or the second electro-hydraulic rotator 54 that permit ready visual confirmation of the respective angles of the inner cylindrical drum 60 and the outer cylindrical drum 62.

While the rotary valve 40 may be used such that the inner cylindrical drum 60 and the outer cylindrical drum 62 are always counter-rotated equal amounts as shown in FIGS. 15-24, it should be appreciated that the rotary valve 40 may be used differently, with the inner cylindrical drum 60 rotated an amount different than the amount which the outer cylindrical drum 62 is rotated. Additionally, though the flow control of the rotary valve 40 may not be as responsive, only one of inner cylindrical drum 60 and the outer cylindrical drum 62 need be rotated, or both may be rotated in the same direction instead of being counter-rotated.

While the rotary valve 40 has been described with respect to certain shapes and sizes of its various components, it should be recognized that the shapes and sizes of the various components may be varied while still performing similar functions. For example, the inner cylindrical drum 60 need not be strictly cylindrical in every embodiment. Instead, the inner cylindrical drum 60 may be slightly tapered, so as to have a slightly larger diameter at the end attached to the first shaft 56. In such an embodiment, the cylindrical bore 66 would be correspondingly shaped so as to fittingly receive the inner cylindrical drum 60 therein. Such tapering may facilitate alignment of the inner cylindrical drum 60 and the outer cylindrical drum 62 during assembly of the drum assembly 92. Similarly, the ends of the inner cylindrical drum 60 need not be squared off, but might have a different shape, such as to facilitate alignment of the inner cylindrical drum 60 and the outer cylindrical drum 62 during assembly of the drum assembly 92, or to reduce weight of the inner cylindrical drum 60.

In similar fashion, the outer cylindrical drum 62 need not be strictly cylindrical in every embodiment. Instead, the outer cylindrical drum 62 may be slightly tapered, so as to have a slightly smaller diameter at the end attached to the second shaft 58. In such an embodiment, the body 46 would be correspondingly shaped so as to fittingly receive the outer cylindrical drum 62 (as part of the drum assembly 92) therein. Such tapering may facilitate alignment of the drum assembly 92 and the body 46 during assembly of the valve 40. Similarly, the ends of the outer cylindrical drum 62 need not be squared off, but might have a different shape for any desired reason, such as to reduce weight of the outer cylindrical drum 62.

While the illustrative rotary valve 40 includes both an inner cylindrical drum 60 and an outer cylindrical drum 62, certain embodiments of the rotary valve may have only a single cylindrical drum. While such an embodiment may not provide all of the advantages of the rotary valve 40 illustrated and discussed herein, such an embodiment may still provide significant advantages over traditional slide valves.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A rotary valve for use in a fluid catalytic cracking unit (FCCU), comprising:
    a valve body having an inlet and an outlet and a flow path extending between the inlet and the outlet, the flow path providing a path for a fluid catalytic cracking material to selectively flow between the inlet and the outlet;
    a first drum rotatably disposed within the valve body in the flow path, the first drum comprising a first drum flow aperture passing therethrough; and
    a first shaft connected to the first drum and extending from an interior of the valve body to an exterior of the valve body through a first shaft aperture;
    wherein a rotational torque applied to the first shaft at the exterior of the valve body causes the first drum to rotate within the valve body to control flow of material through the flow path and the first drum flow aperture; and
    a refractory cone adapted to be set in an inlet area extending in the interior of the valve body between the inlet and the first drum and to be primarily secured in the inlet area by gravity.

2. The rotary valve of claim 1, further comprising a first rotator coupled to the first shaft at the exterior of the valve body and adapted to apply a rotational torque to the first shaft, the first rotator being selected from the group consisting of a hydraulic rotator, an electric rotator, and an electro-hydraulic rotator.

3. The rotary valve of claim 1, wherein the first drum flow aperture comprises a refractory material surface.

4. The rotary valve of claim 1, wherein the rotary valve further comprises:
    a second drum rotatably disposed within the valve body in the flow path, the second drum comprising:
        a bore adapted to rotatably receive the first drum therein;
        an upstream flow aperture; and
        a downstream flow aperture;
    wherein the upstream flow aperture and the downstream flow aperture are located on the second drum such that the first drum and the second drum can be rotated so the upstream flow aperture, the first drum flow aperture, and the downstream flow aperture are substantially aligned and share a common axis.

5. The rotary valve of claim 4, wherein the second drum is connected to a second shaft that extends from the interior of the valve body to the exterior of the valve body through a second shaft aperture disposed on an opposite side of the valve body from the first shaft aperture, wherein a rotational torque applied to the second shaft at the exterior of the valve body causes the second drum to rotate within the valve body to control flow of material through the flow path, the upstream flow aperture, the first drum flow aperture, and the downstream flow aperture.

6. The rotary valve of claim 5, further comprising a second rotator coupled to the second shaft at the exterior of the valve body and adapted to apply a rotational torque to the second shaft, the second rotator being selected from the group consisting of a hydraulic rotator, an electric rotator, and an electro-hydraulic rotator.

7. The rotary valve of claim 4, wherein the first drum and the second drum are adapted to be counter-rotated to control flow of material through the flow path.

8. A rotary valve for use in a fluid catalytic cracking unit (FCCU), comprising:
    a valve body having an inlet and an outlet and a flow path extending between the inlet and the outlet, the flow path providing a path for a fluid catalytic cracking material to selectively flow between the inlet and the outlet;

a first drum rotatably disposed within the valve body in the flow path, the first drum comprising:
   a bore adapted to rotatably receive a second drum therein;
   an upstream flow aperture; and
   a downstream flow aperture
the second drum rotatably disposed within the bore of the first drum, and comprising a second drum flow aperture passing therethrough;
wherein the upstream flow aperture and the downstream flow aperture are located on the first drum and the second drum flow aperture is located on the second drum such that the first drum and the second drum can be rotated so the upstream flow aperture, the second drum flow aperture, and the downstream flow aperture are substantially aligned and share a common axis;
a first shaft connected to the first drum and extending from an interior of the valve body to an exterior of the valve body through a first shaft aperture;
a second shaft connected to the second drum and extending from the interior of the valve body to the exterior of the valve body through a second shaft aperture located on an opposite side of the valve body from the first shaft aperture; and
a refractory cone adapted to be set in an inlet area extending in the interior of the valve body between the inlet and the first drum and to be primarily secured in the inlet area by gravity.

9. The rotary valve of claim 8, wherein a rotational torque applied to the first shaft at the exterior of the valve body causes the first drum to rotate within the valve body, and wherein a rotational torque applied to the second shaft at the exterior of the valve body causes the second drum to rotate within the first drum, whereby rotation of the first drum and rotation of the second drum control flow of material through the flow path.

10. The rotary valve of claim 8, wherein the first drum and the second drum are adapted to be counter-rotated to control flow of material through the flow path.

* * * * *